(12) United States Patent
Nickel

(10) Patent No.: US 11,821,728 B2
(45) Date of Patent: *Nov. 21, 2023

(54) DEVICES, SYSTEMS AND METHODS FOR EVALUATING OBJECTS SUBJECT TO REPAIR OR OTHER ALTERATION

(71) Applicant: Greg Nickel, Aptos, CA (US)

(72) Inventor: Greg Nickel, Aptos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,490

(22) Filed: Sep. 15, 2022

(65) Prior Publication Data
US 2023/0016487 A1    Jan. 19, 2023

Related U.S. Application Data

(63) Continuation of application No. 16/445,145, filed on Jun. 18, 2019, now Pat. No. 11,566,881, which is a continuation of application No. PCT/US2017/067753, filed on Aug. 12, 2018.

(60) Provisional application No. 62/548,067, filed on Aug. 21, 2017, provisional application No. 62/479,313, filed on Mar. 31, 2017, provisional application No. 62/436,423, filed on Dec. 20, 2016.

(51) Int. Cl.
| | |
|---|---|
| G06F 3/048 | (2013.01) |
| G01B 5/06 | (2006.01) |
| G01B 7/06 | (2006.01) |
| G01B 11/00 | (2006.01) |
| G01B 17/02 | (2006.01) |
| G06V 20/20 | (2022.01) |

(52) U.S. Cl.
CPC ............. *G01B 5/066* (2013.01); *G01B 7/105* (2013.01); *G01B 11/002* (2013.01); *G01B 17/025* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 2009/0157349 A1* | 6/2009 | Walker | G01B 7/066 702/170 |
| 2015/0347854 A1* | 12/2015 | Bare | G01S 5/00 345/633 |

OTHER PUBLICATIONS

Shen, Terahertz Sensor for Noncontact and Non-destructive Inspection of Automotive Paints, Sensor Networks and Data Communications, Nov. 27, 2014.
U.S. Appl. No. 16/445,145, filed Jun. 18, 2019, parent to the present patent application.

* cited by examiner

*Primary Examiner* — William C Trapanese

(57) ABSTRACT

A method can include identifying an inspected object with an inspection device; viewing the inspected object through an augmented reality device to identify points; and measuring a thickness of a layer at the inspection points. In response to detecting a region of interest on the surface of the inspected object, an image of the region of interest can be taken. By operation of communication circuits, at least the thickness measurements and images can be transmitted to a server system. A value of the inspected object can be adjusted based on at least the thickness measurements and images from the at least one inspection device. Corresponding devices and systems are also disclosed.

20 Claims, 15 Drawing Sheets

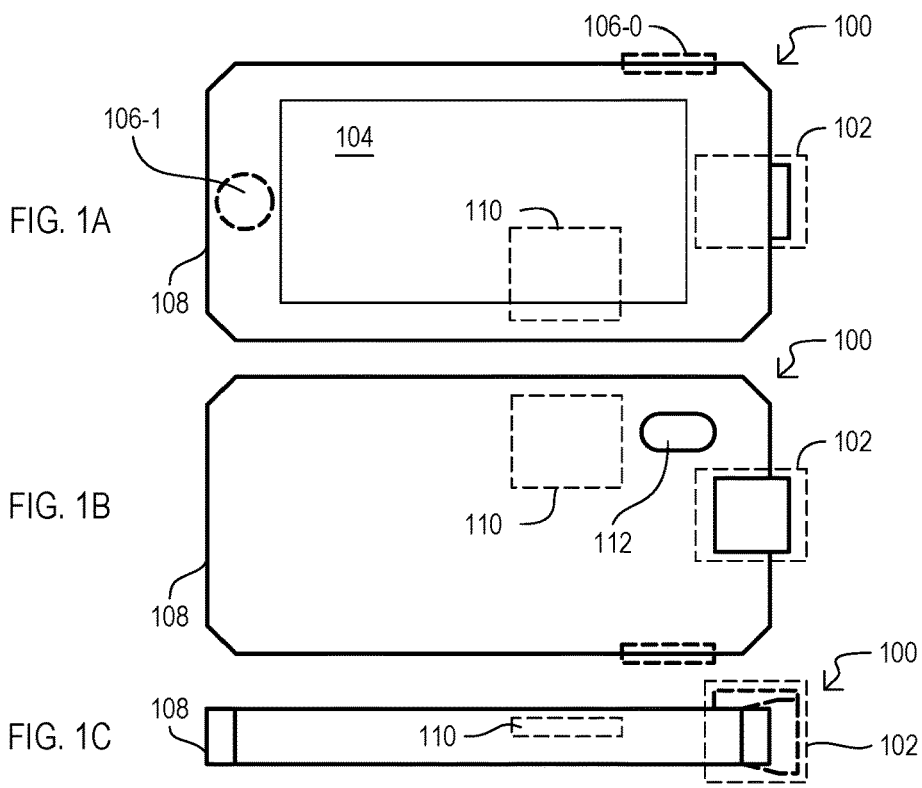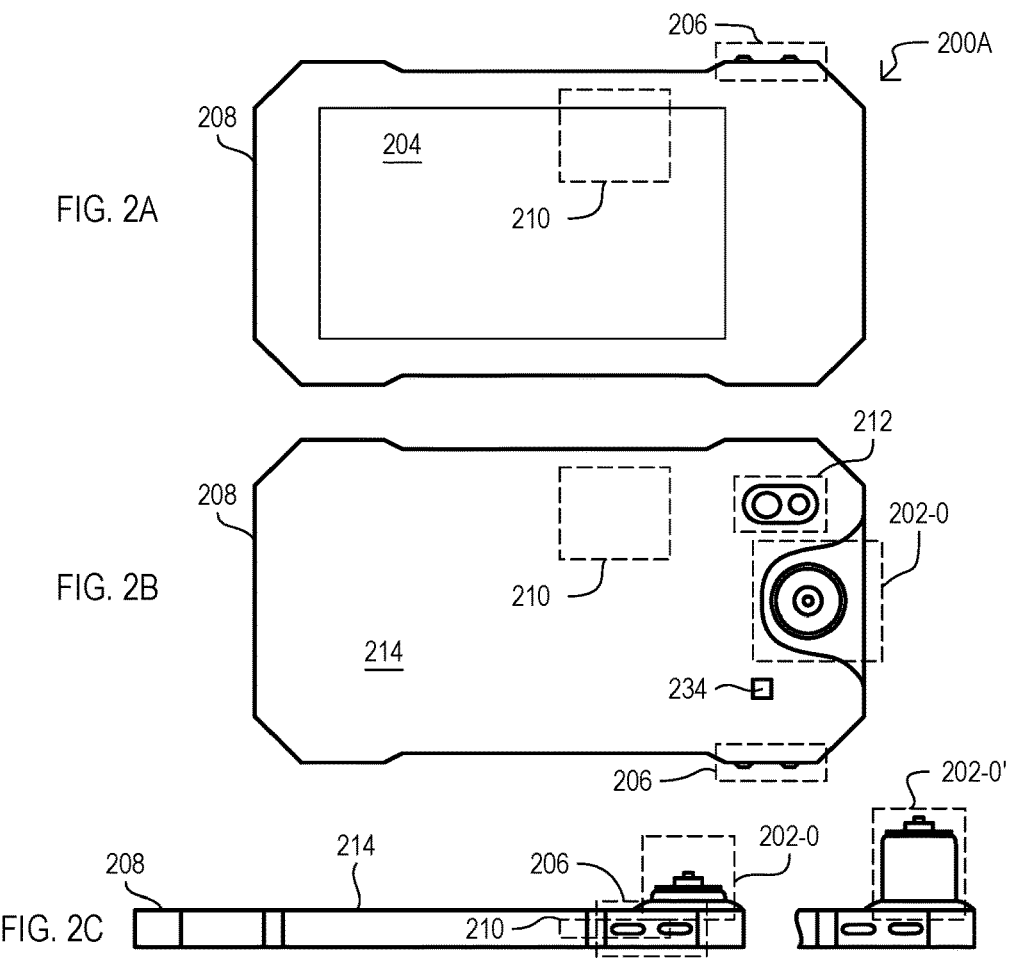

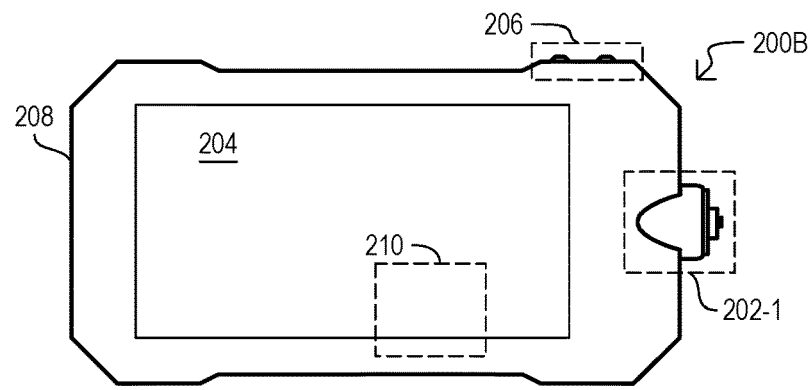
FIG. 2D
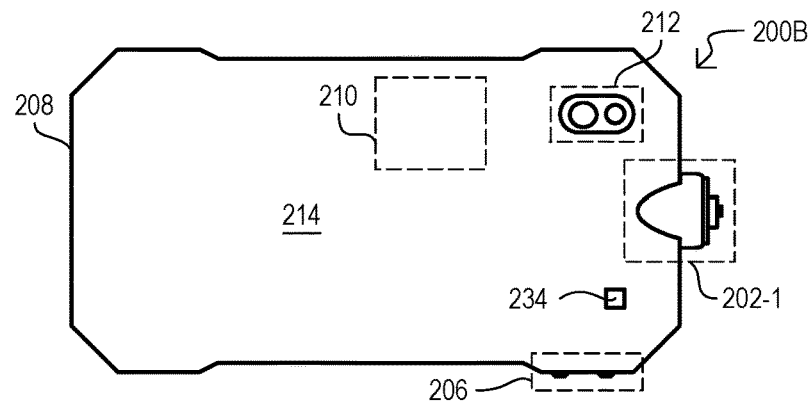
FIG. 2E
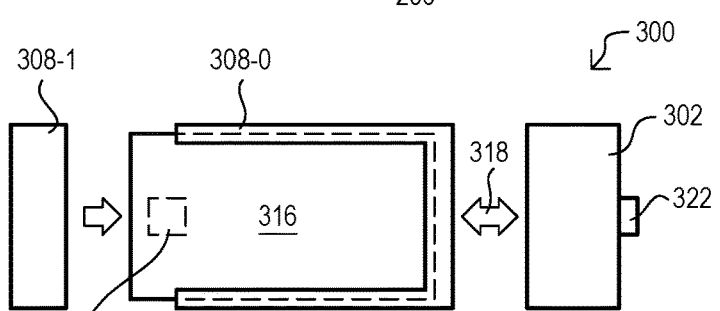
FIG. 3
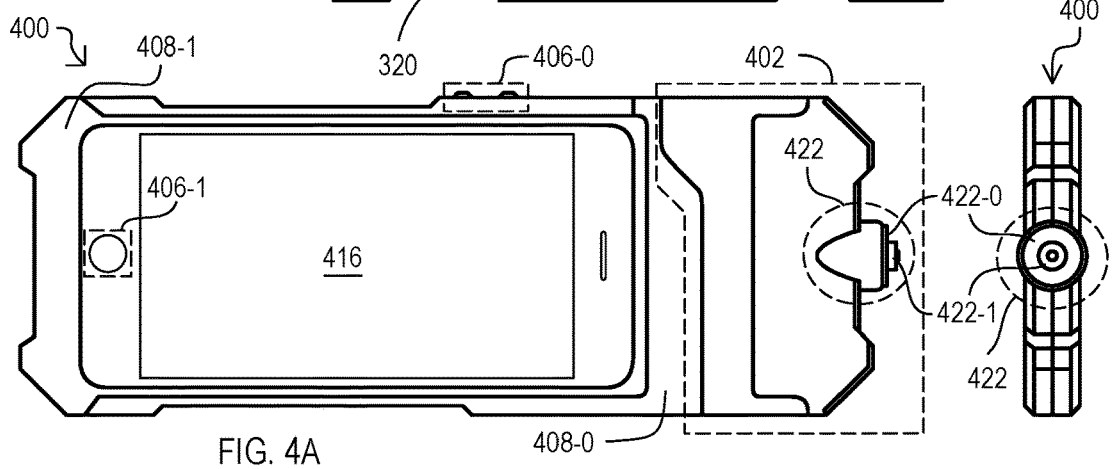
FIG. 4A
FIG. 4C
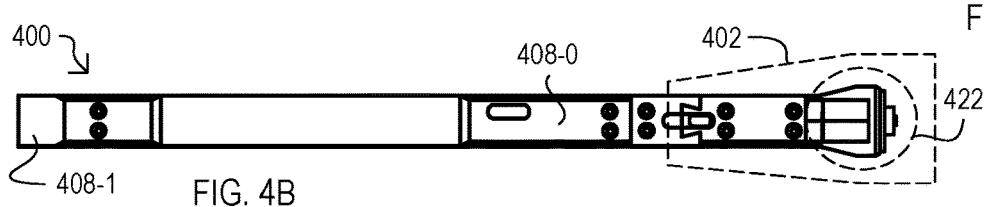
FIG. 4B

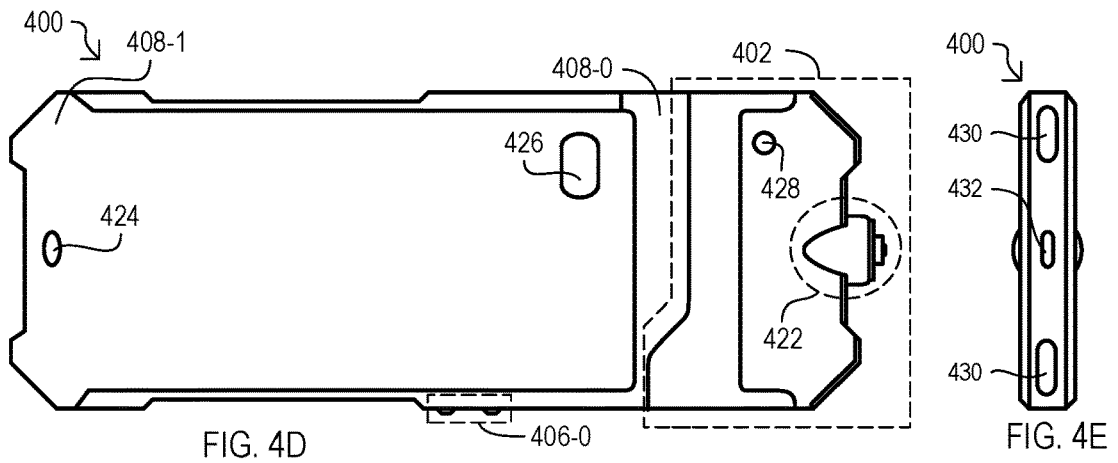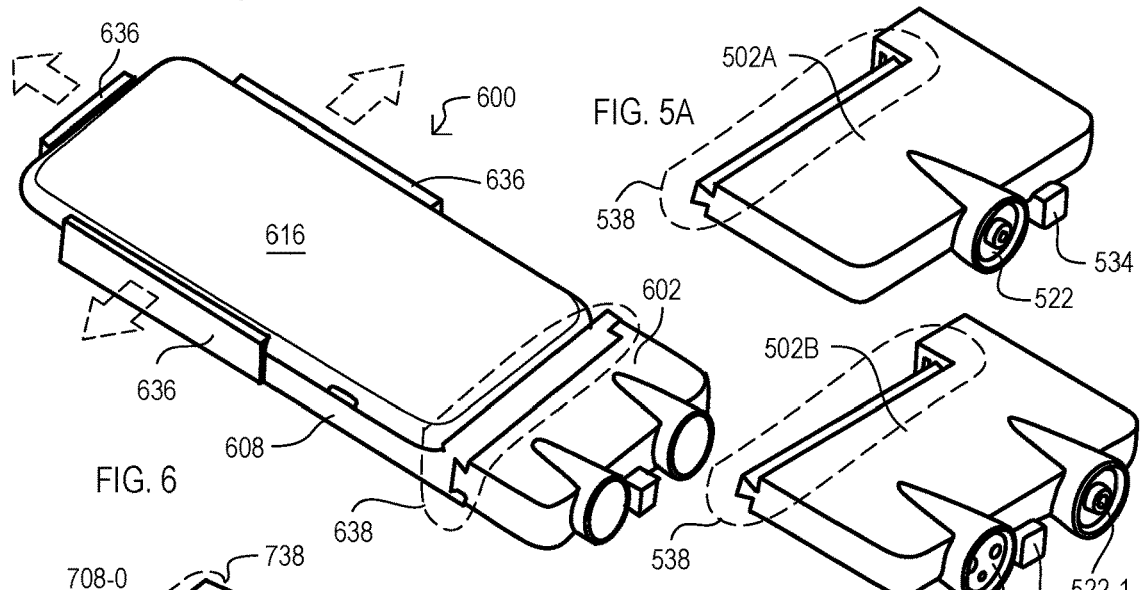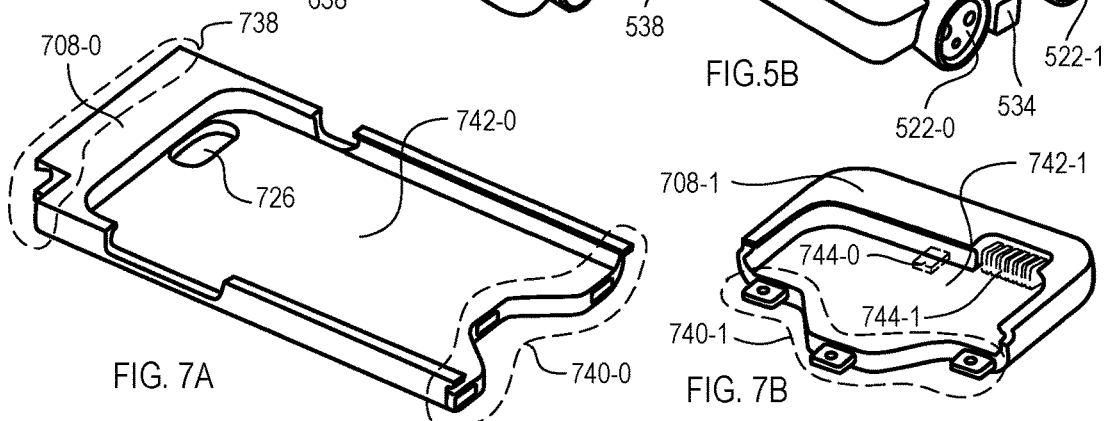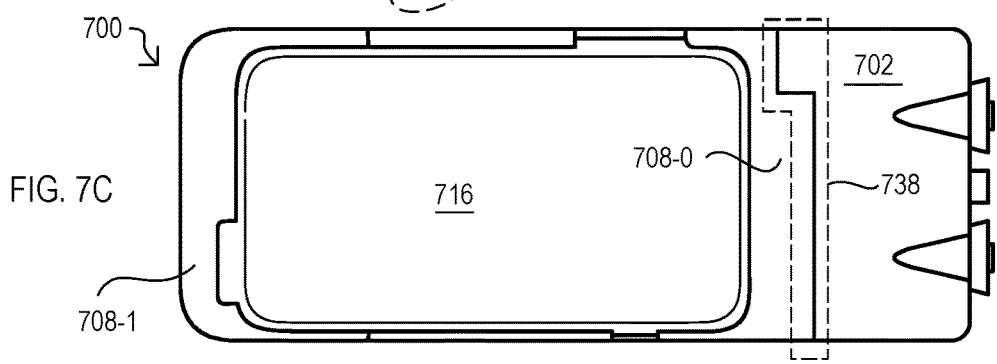

| Stk # | Year/Make Mode/body Color/Miles | Alert | ADJ | Book Value | Price | Battery | Gas | Check Engine | Last Start | Locate | Time In Service | Time FL |
|---|---|---|---|---|---|---|---|---|---|---|---|---|
| A0001 | 2015 Mercedes S550 Sedan Silver 15,100 | ● | 14% | $67,000 | $61,620 | ○ | ○ | ○ | ⊗ | ? | ○ | ⊗ |
| LN075 | 2017 Audi A4 Sedan Red 6,459 | ⊗ | 4% | $45,000 | $43,200 | ○ | ⊗ | ○ | ○ | ? | ⊗ | ⊗ |
| A2002 | 2013 Audi A6 Sedan Black 32,501 | ○ | 0% | $37,200 | $37,200 | ⊗ | ○ | ○ | ○ | ? | ○ | ○ |
| T3049 | 2009 Scion xD Hatchback Blue 150,700 | ⊗ | 2% | $4,571 | $4,479 | ○ | ○ | ⊗ | ⊗ | ? | ● | ○ |
| TG702 | 2015 Land Rover RR Sport SUV White 19,677 | ● | 10% | $64,679 | $58,212 | ○ | ○ | ○ | ○ | ? | ○ | ● |
| AS002 | 2013 Toyota Highlander SUV Blue 18,925 | ⊗ | 6% | $32,588 | $30,633 | ⊗ | ● | ○ | ○ | ? | ○ | ⊗ |
| TG009 | 2013 Subaru Outback SUV Silver 15,100 | ○ | 0% | $16,357 | $16,357 | ● | ○ | ○ | ○ | ? | ○ | ○ |
| TJ789 | 2013 Lexus CT Hatchback Red 41,673 | ⊗ | 4% | $21,650 | $20,784 | ○ | ○ | ○ | ○ | ? | ● | |
| TG140 | 2012 Audi A5 Convertible Grey 50,104 | ⊗ | 2% | $24,120 | $23,638 | ⊗ | ○ | ○ | ⊗ | ? | ● | |
| PN444 | 2014 BMW 4 Series Coupe Black 14,500 | ● | 7% | $38,250 | $35,573 | ○ | ● | ○ | ○ | ? | ⊗ | ○ |

FIG. 20

DEVICES, SYSTEMS AND METHODS FOR EVALUATING OBJECTS SUBJECT TO REPAIR OR OTHER ALTERATION

RELATED APPLICATIONS

This application is a continuation-in-part of U.S. patent application Ser. No. 16/445,145 filed Jun. 18, 2019, which is a continuation of International Application No. PCT/US2017/067753 having an international filing date of Dec. 20, 2017, which claims priority to U.S. Provisional Patent Application No. 62/436,423 filed on Dec. 20, 2016, No. 62/479,313 filed Mar. 31, 2017, and No. 62/548,067 filed Aug. 21, 2017, the contents all of which are incorporated by reference herein.

BACKGROUND

Manufactured products can often be subject to repair or other alteration that is not detectable to the eye or cursory inspection. Such undetectable changes can greatly affect the value of the product. As but one of many possible examples, automobiles that have been the subject of accidents can be repaired to the point where the extent of the repair cannot be known without special equipment or extensive inspection.

In 2015, it was estimated that 14.6 million used automobiles were sold. Further, there was an average of about six million car accidents per year. Of these, it is estimated that about thirty percent of the crashes went unreported.

Pay services exist that report information on automobiles, including information on accidents. However, not every accident or damage event is reported to such services. In fact, such services usually recommend a prospective buyer obtain a vehicle inspection from dealer or independent mechanic.

Any way of increasing the speed or uniformity by which a product can be inspected, and then evaluated in light of any changes, could enjoy wide use in a variety of industries, including but not limited to the automobile industry.

BRIEF DESCRIPTION OF THE DRAWINGS

FIGS. 1A to 1C are block diagrams showing an inspection device according to various embodiments.

FIGS. 2A to 2E are diagrams showing an inspection device according to embodiments.

FIG. 3 is a diagram showing an inspection device according to another embodiment.

FIGS. 4A to 4E are diagrams showing an inspection device according to an embodiment.

FIGS. 5A and 5B are diagrams showing meter portions that can be included in embodiments.

FIG. 6 is a diagram showing an inspection device according to another embodiment.

FIGS. 7A to 7C are diagrams showing housing components and an inspection device according to embodiments.

FIG. 20 is a diagram of database that can be created, modified, and/or included in embodiments.

DETAILED DESCRIPTION

Figure 8A:
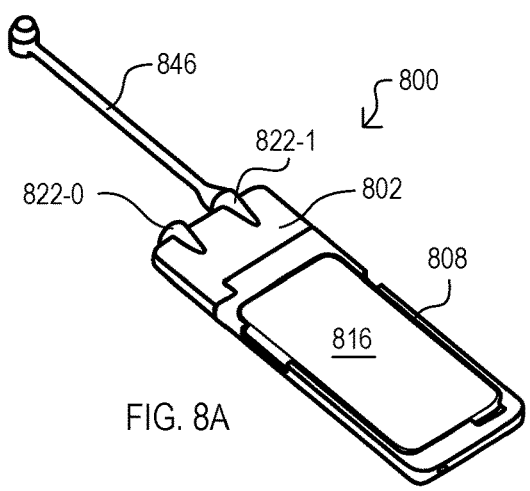
FIGS. 8A and 8B are diagrams showing an inspection device and ultrasonic probe according to embodiments.

Embodiments disclosed herein can include devices, systems and methods by which objects can be evaluated. According to embodiments, systems can include a handheld inspection device having a display which can indicate where an object can be inspected by any of a number of different meters on the inspection device. Inspection data can be used to automatically adjust a value of the inspected object.

In some embodiments, an inspection device can include an integrated meter portion that can include three different measurement devices integrated into a singular structure.

In some embodiments, an inspection device can include a paint meter.

In some embodiments, a system can include a computing device configured to execute an application that can automatically adjust the value of an inspected object based on inspection data generated by the inspection device for the object.

Embodiments can include an inspection device that can read features on surfaces of an object for the creation of an electronic record of the object and the associated readings. The automatic inspection device can include any or all of the following features: multiple, automatic measuring tools; be handheld and communicate inspection data and/or results wirelessly; and communicate with larger system to integrate the electronic record with one or more existing databases and adjust a value of the inspected object based on the electronic record.

Embodiments also anticipate an inspection device formed by attaching an inspection portion to an existing type of portable electronic devices (e.g., cell phones, tablet computer), and in some embodiments, include one or more additional batteries for increased power.

In particular embodiments, an automatic inspection device can be a vehicle inspection device that includes an automatic paint meter. In some embodiments, the device can include multiple types of paint meters for use with different substrates (e.g., eddy current and magnetic for metals, an ultrasonic pulse for carbon-fiber or plastic). Such an inspection device can include additional measurement devices including but not limited to a laser pointer device, range finder (including a LIDAR system) and a camera.

While a camera can be integrated feature of the inspection device, in some embodiments, a camera can be part of an electronic device that forms part of the inspection device or can be attached to the inspection device.

In some embodiments, an automatic inspection device can be loaded with an application to enable a uniform inspection of objects. Such an application can present an image of an object to be inspected (e.g., a vehicle), and identify regions for inspection, which can include particular points of inspection (i.e., points where the inspection device should contact with, or proximity to, the object to take the reading).

An application running on the inspection device can include any or all of the following: an application presents a point for inspection, and once a reading is taken and verified, presents a next point for inspection; a user can take a reading and then indicate where the inspection point for the reading, the user can then indicate where on the object the reading was taken.

In very particular embodiments, an inspection device can be a paint meter that enables the rapid reading and capture of paint thickness readings. Such readings can be associated with other data for a vehicle, including but not limited to photos or videos. Still further, authorized users can verify readings for specific vehicles using the automatic inspection device and an electronic identification device connected to the vehicle (e.g., dongle) or between the automatic inspection device and built-in wireless systems of the vehicle. A vehicle is understood to be a means of transporting something e.g., automobile, aircraft, train, watercraft, truck tractors, construction vehicles, agricultural vehicles, both autonomous or driven/piloted.

As will be described in more detail herein, in some embodiments inspection data generated by an inspection device can be used to adjust a valuation of the object, based on variance between an inspection reading, and an expected or other predetermined value.

In the particular embodiments shown below, like items are referred to by the same reference characters but with the leading digits corresponding to the figure number.

FIGS. 1A-1C are a series of views showing a handheld inspection device 100 according to an embodiment. FIG. 1A is a front plan view. FIG. 1B is a back plan view. FIG. 1C is a side plan view. Inspection device 100 can include a case (or housing) 108 which can contain, otherwise include or have attached to, various components of the inspection device 100. A case 108 can be a unitary structure, which integrates the various components, or can be an assembly which can attach to, partially enclose, or enclose a computing device, such as a handheld computing device like a smartphone, or the like. While FIGS. 1A-1C show a case having a particular shape, such an arrangement should not be construed as limiting.

Inspection device 100 can include a meter portion (or section) 102, a display 104, one or more controls 106-0/1, and one or more processors 110. A meter portion 102 can include two or more different meters for taking measurements on a surface of an inspected object. In some embodiments, meter portion 102 can include two or more different types of paint meters for measuring a paint thickness of an inspected object, such as an automobile, or the like. In some embodiments, meter portion 102 can include the different meters integrated into a single assembly. However, in other embodiments a meter portion 102 can include meters as separate assemblies. In particular embodiments, meter portion 102 can include any two of: an eddy current type paint meter, magnetic type paint meter, or ultrasonic type paint meter. In a very particular embodiment, meter portion 102 can include a single assembly that includes all three types of paint meters. In some embodiments, a meter portion 102 can further include light projecting device, such as a laser, LED or LIDAR assembly, which can project a beam and/or image on an object being inspected and/or determine a distance to an object being inspected.

In alternate embodiments, a meter portion 102 can include a tether or the like which flexibly extends from body 108 and includes the measuring surfaces of the metering portion 102.

A meter portion 102 can include measurement devices and tools according to any of the embodiment disclosed herein, or equivalents.

A display 104 can present images to a user of inspection device 100. While display 104 can provide any suitable information to a user, according to embodiments, a display 104 can present measuring locations for a user of the inspection device 100 to indicate where measurements should be taken with meter portion 102. While such measurement locations can be indicated by any suitable form on the display 104, including only text, one or more images, or text in conjunction with images, in particular embodiments, display 104 can present an image of the inspected object that includes indications on the image as to where measurements can/should be taken. In a very particular embodiment, display 104 can present an "augmented reality" type image, in which measurement locations are presented as overlay data on an image of the object being inspected, where such an image is captured, or being captured, by the inspection device 100, or otherwise viewed at through an inspection device 100.

In alternate embodiments, including particular examples shown below, a display can be separate from a case, such as glasses/goggles, or the like, for augmented reality applications and the like.

Controls 106-0/1 can enable a user to activate and control inspection device 100. Controls 106-0/1 can take any suitable form, including physical switches activated by a user. In addition or alternatively, controls can include a touch interface presented on all or a portion of display 104.

One or more processors 110 can execute machine readable instructions which can enable the inspection device 100 to execute various functions. Such instructions can include an inspection application, which can present measurement locations on display 104 according to the object being inspected. Such applications, according to particular embodiments, are described at a later point herein.

In the embodiment of FIGS. 1A-1C, inspection device 100 can include one or more image capture devices 112. Image capture devices 112 can include a camera and any ancillary sensors and circuitry, including depth sensors, a flash light source, etc. In some embodiments, image capture device(s) 112 can capture an image of the object being inspected and/or to be inspected.

In alternate embodiments, an image capture device of an inspection device can be included in a meter portion 102.

According to embodiments, a metering portion of a handheld inspection device can have various orientations, including an adjustable orientation. However, in some embodiments, a metering portion can have a measuring face in the same direction as a corresponding image capture device. FIGS. 2A-2C show a particular example of one such embodiment.

FIGS. 2A-2C show a handheld inspection device 200A in a same series of views as FIGS. 1A-1C. Inspection device 200A can be one particular implementation of that shown in FIGS. 1A-1C. Inspection device 200A can have items similar to those of FIGS. 1A-1C, including a display 204, controls 206, case 208, processor 210 and image capture device 212. In FIGS. 2A-2C, meter portion 202-0 can have a measuring face oriented in the image capture direction of image capture device 212. In such an arrangement, an application executable by processor(s) 210 can present an image of an object to be inspected with overlay dated, as noted above, on display 204. A user of the inspection device 200A can then use such overlay data to guide meter portion 202-0 to an overlaid inspection point on the inspected object using the image in display 204.

As shown in FIG. 2B, an inspection device can further include an indicator/range finder 234. Indicator/range finder 234 can project light and/or determine a range of an inspected object. Indicator/range finder 234 can include, but is not limited to, a laser, a laser based range finder, an LED, a LIDAR system, or a sonar based range finder, or projector (e.g., infrared) camera based system.

As shown in FIG. 2C, a meter portion 202-0 can have a relatively short extension from a surface 214 which contains image capture device 212. In addition or alternatively, a meter portion 202-0' can have a relatively long extension from a surface 214. Further, a metering portion 202-0 could allow for a variable extension from surface 214 (e.g., telescopes outward from the surface, has attachments to extend from the surface, etc.).

FIGS. 2D and 2E show an inspection device 200B according to another embodiment in the same views as FIGS. 2A and 2B. Inspection device 200B can be one particular implementation of that shown in FIGS. 1A-1C. Inspection device 200B can have items similar to those of FIGS. 2A-2C. FIGS. 2D/E can differ from FIGS. 2A-2C in that meter portion 202-1 can have a measuring face in a direction of an edge of inspection device 200B. Meter portion 202-1 can be subject to the same variations noted for meter portions herein, including but not limited to, having an image capture device formed therein, a tether to allow flexible placement of a measuring face, and/or a greater or shorter extension from an edge of the inspection device.

FIG. 3 shows an inspection device according to a further embodiment. Inspection device 300 can be one particular implementation of that shown in FIGS. 1A-1C. An inspection device 300 can include a housing that is formed by an assembly of multiple pieces 308-0/1. In the embodiment shown, an inspection device 300 can include a main housing 308-0/1, a meter section 302, a computing device 316, and a connection 318 between meter section 302 and main housing 302-0/1.

Main housing 308-0/1 can receive a computing device 316. Main housing 302-0/1 can be adaptable to receive various types of computing devices. In the particular embodiment shown, main housing 302-0/1 can include a body portion 308-0 and detachable end portion 308-1. In some embodiments, detachable end portion 308-1 can include an electrical interface with computing device 316. Such an electrical interface can be wired or wireless. However, in other embodiments, end portion 308-1 can include no electrical interface. Main housing 302-0/1 can further include other components, including any of: a battery, a battery charging component (e.g., induction coil for wireless charging, wired connections for wired charging); switches (electronic or otherwise) for switching between a housing battery and a battery of computing device 386. Main housing 302-0/1 can include any suitable mechanical adjustments for accommodating computing devices of varying sizes, including moveable portions, or substitutable portions.

In some embodiments, a computing device 316 can be handheld computing device, including but not limited to a smart phone or tablet computing device. However, embodiments can include any suitable electronic device, including a custom computing device manufactured for the inspection device 300. Computing device can include one or more processors 320 that can execute inspection device applications as described herein, and equivalents.

A meter section 302 can include one or more measuring tools. In some embodiments, meter section 302 can include an integrated measuring device 322 that includes multiple different measuring devices in one. In particular embodiments, measuring device 322 can include any of those described herein and equivalents. In some embodiments measuring device 308 can be a paint meter that includes an ultrasonic transducer, eddy current detector, and magnetic detector. Such measuring devices can be separate or partially integrated (2-in-1 with a one standing alone), for fully integrated (e.g., 3-in-1).

An inspection device 300 can also include an indicator/range finder (e.g., laser, LIDAR system, etc.). In some embodiments, an indicator/range finder can be located in a meter section 302. However, in other embodiments, an indicator/range finder can be separate from measuring device 322. In some embodiments, measuring device 322 can include an indicator/range finder. A range finder can be integrated with, or separate from a laser.

While a meter section 302 can be separately attachable to a housing 308-0/1 (which can include a computing device), in some embodiments, meter section 302 can be integrated with a such housing.

A connection 318 can enable a communication path between meter section 302 and computing device 316. In particular embodiments, connection 318 can enable computing device 316 to control measuring devices (e.g., 322) in meter section 302 and/or acquire measuring data from meter section 302. Connection 318 can take any suitable wireless form, including but not limited to near field communication methods, intermediate communication methods (e.g., Bluetooth, IEEE 802.31), or even cellular communication protocols. In addition or alternatively, connection 318 can take any suitable wired form, including but not limited to USB (in any suitable forms including power delivery forms), Firewire, Lightning (by Apple, Inc.), or communications over any other connector, such as an audio jack, or communication over a power supply line.

In some embodiments, inspection device 300 can include an authentication tool 320, for authenticating a user of the inspection device 300. An authentication tool 320 can be any suitable tool, such as a biometric security tool, including but not limited to, a fingerprint scanner, retina scanner, facial recognition system, voice recognition system, or device reader (e.g., card reader, chip reader, RFID detector). Authentication tool 320 can be part of computing device 316, or can be part of main housing 302-0/1, or a combination thereof.

It is understood that an inspection device 300 can include additional sensors or cameras mounted on a housing 308-0/1 or meter section 302. Such additional sensors/cameras can be separate from computing device 316.

FIGS. 4A-4D are a series of views showing a handheld inspection device 400 according to another embodiment. FIG. 4A is a front plan view. FIG. 4B is a side plan view. FIG. 4C is a top plan view. FIG. 4D is a back plan view. FIG. 4E is a bottom plan view. Inspection device 400 can be one particular implementation of that shown in FIG. 3. Inspection device 400 can have items similar to those of FIG. 3, including a main housing 408-0/1, a meter section 402, a computing device 416, and an integrated measuring device 422.

A main housing 408-0/1 can accommodate a computing device 416 (e.g., smartphone), and include an external battery (i.e., external to the computing device 416) which can provide power to the computing device 416, meter section 402, or both.

Inspection device 400 can provide three measuring devices in one: an ultrasonic transducer 422-0, and an eddy current sensor combined with a magnetic sensor (together shown as 422-1). An ultrasonic transducer 422-0 can have a hollow body, allowing eddy current/magnetic sensor 422-1 to be located within the ultrasonic transducer 422-0. Further, eddy current/magnetic sensor 422-1 can retract into and/or extend out of the ultrasonic transducer 422-0 with some degree of travel. In the particular embodiment shown, eddy current/magnetic sensor can be mounted on a plunger spring within a sliding sleeve.

While such sensors can be used to measure various properties of an object, in particular embodiments, such sensors can be used to measure a thickness of paint.

As shown in FIG. 4D, a main housing 408-0/1 can include an external battery indicator 424 (in housing portion of 408-1). External battery indicator 424 can provide any of various indications, including indicating the status of a battery within the computing device 416, a battery within a main housing 408-0/1 (but separate from the computing device), or both.

In some embodiments, a meter section 402 can include mechanical lock for attachment to a main housing 408-0. In some embodiments, a slide lock latch can be employed. However, any suitable physical connection can be utilized.

Referring still to FIG. 4D, a housing 408-1 can also include a camera window 426 (for a camera in computing device 416) and a window 428 for a laser and/or range finder incorporated into meter section 402. Meter section can also include a 3-in-1 sensor, as described herein or an equivalent.

Referring to FIG. 4E, a main housing 408-0/1 can also include speaker windows 430 and a wired connection window (e.g., window for USB-C port) 432 for a computing device 416.

FIGS. 5A and 5B are perspective views showing meter sections that can be included in embodiments. Meter section 502A of FIG. 5A, can include an integrated measuring device 522, a laser and/or range finder 534, and meter portion mechanical connection 538.

A measuring device 522 can take the form of any of those described herein, or equivalents, and in a particular embodiment, can be a 3-in-1 paint meter, having an ultrasonic sensor, eddy-current sensor and magnetic sensor.

A laser 534 can emit light for identifying a point on an inspected object, when taking a picture or video of the object, for example. A range finder 534 can find a range for an object to be inspected.

A mechanical connection 538 can connect a meter section 502A to a main housing of an inspection device. Mechanical connection 538 can include a sliding lock connection, but as noted above, any suitable mechanical connection can be employed.

Meter section 502B of FIG. 5B, can include items like those of FIG. 5A. Meter section 502B can differ from that of FIG. 5A in that it can include separate measuring devices 522-0 and 522-1. In a particular embodiment, measuring device 522-0 can be an ultrasonic sensor, while measuring device 522-1 can be a combination eddy current/magnetic sensor.

FIG. 6 shows an automatic inspection device 600 according to another particular embodiment. As shown, an inspection device 600 can include an attachable meter portion 602 that can connect to an electronic device 616 (e.g., portable electronic device such as a smart phone) via a mechanical connection 638. While FIG. 6 shows a meter portion 602 like that shown in FIG. 5B, a meter portion 602 can take the form of any other suitable meter portion shown herein, or an equivalent.

Inspection device 600 can be conceptualized as having a main housing 608 having a phone case, which can be particular to one type of phone size and shape, or, as shown in FIG. 6, can include one or more adjustable housing members 636 which can move to accommodate electronic devices of various sizes and shapes.

As noted herein, it is understood that embodiments can include fewer or greater numbers of measuring tools. Further, the particular arrangement and appearance of the inspection devices that incorporate electronic devices should not be construed as limiting, as embodiments anticipate unitary inspection devices. Adjustable housing members 636 can have different shapes for better ergonomics and/or to accommodate different shapes of electronic devices 616.

FIGS. 7A and 7B show one example of a main housing that can be included in embodiments. FIG. 7A shows one portion 708-0 (a top portion) of a main housing. Top portion 708-0 can include a first cavity portion 742-0, meter connection portion 738, housing connection portion 740-0, and a window 726. FIG. 7B shows another portion 708-1 (a bottom portion) of a main housing. Bottom portion 708-1 can include a cavity portion 742-1 and housing connection portion 740-1. Cavity portions 742-0/1 can be configured to receive, and mechanically secure, an electronic device in the main housing when portions 708-0 and 708-1 are joined. A meter connection portion 738 can be configured to enable a connection to a meter section/portion, and can include a mechanical connection and in some embodiments an electrical connection. Housing connection portions 740-0/1 can be configured to interlock and form a main housing from portions 708-0/1. A window 726 can align with a camera of an electronic device inserted into cavity 742-0/1. It is understood that other embodiments can include single piece cases, or cases with more than two sections.

In some embodiments, a housing portion 708-0 or 708-1 can include a battery for providing extra power for an electronic device. In the particular embodiment shown, housing portion 708-1 can include one or more battery connections 744-0/1 which can enable a battery (e.g., video battery) included in housing portion 708-0 to connect to an electronic device.

FIG. 7C shows an inspection device 700 that includes housing portions 708-0/1 like those shown in FIGS. 7A and 7B. FIG. 7C shows an electronic device 716 positioned in a cavity formed by housing portions 708-0/1. Also shown in a meter portion 702 attached to housing portion 708-0 by meter connection 738. Further, as noted herein, either of housing portions 708-0/1 can include additional cameras and/or sensors.

FIG. 8A shows an inspection device 800 according to another embodiment. Inspection device 800 can include a main housing (case) 808 which can hold a computing device (e.g., phone) 816, and meter portion 802. A main housing 808 can take the form of any of those shown herein, or equivalents. In the particular example shown, inspection device 800 can include a meter portion 802 like that shown in FIG. 5B, including measuring tools 822-0 and 822-1.

FIG. 8A shows inspection device 800 with a probe 846 extended. A probe 846 can be used to make measurements. In some embodiments, a probe 846 can be an ultrasonic probe. In particular embodiments, probe 846 can be an ultrasonic probe that can measure a paint thickness for non-metal substrate (e.g., plastic, carbon fiber). In some embodiments, a probe 846 can be attached and removed from inspection device 800, while in other embodiments a probe 846 can extend from and retract into (e.g., telescope) inspection device 800.

Figure 8B:
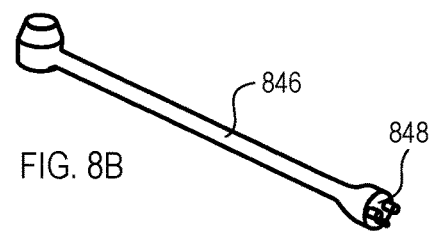

FIG. 8B is a diagram of a probe 846 that can be included in embodiments. A probe 846 can include a probe connection 848 for connecting to a meter portion of an inspection device.

In some embodiments, a system can operate in conjunction with an object identification device. An object identification device can store data for an object to be inspected, and can transfer such data to a system electronically, including wirelessly or by way of a wired connection. In some embodiments, an object identification device can be capable of being attached to an electronic interface of the object to be inspected. An inspection device can then communicate with an object identification device, preferably over a wireless connection.

Figure 9:
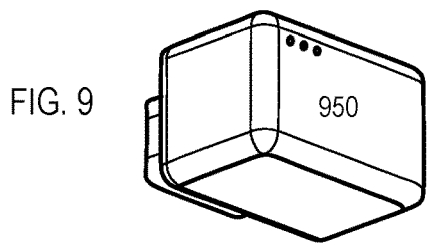
FIG. 9 is a diagram of an object identification device that can be included in embodiments.

FIG. 9 is a perspective view of one particular object identification device that can be included in embodiments. In the particular embodiment shown, an object identification device 950 can be dongle that can have an interface compatible with a standardized connection (e.g., OBDII). It can communicate via any suitable wired or wireless communication protocol, including but not limited to Bluetooth. An object identification device can include other components, including geolocation components (e.g., GPS or an equivalent system), as well as systems for reading an object's (e.g., automobile's) data, including a vehicle ID and/or use data. Embodiments anticipate any suitable wireless communication other than Bluetooth varieties (e.g., NFC, IEEE 802.11, etc.). Communication can also include passive response systems (e.g., RFID).

Embodiments can include applications executable by a processor of an inspection device. Such applications can enable uniform and accurate evaluations of an inspected device by presenting a like set of measurement locations for the same types of objects. As but one example, for a same model of automobile, a same set of measurement locations can be indicated. As but another example, all automobiles could have a same superset of measurement locations. Applications according to very particular embodiments will now be described.

Figure 10:
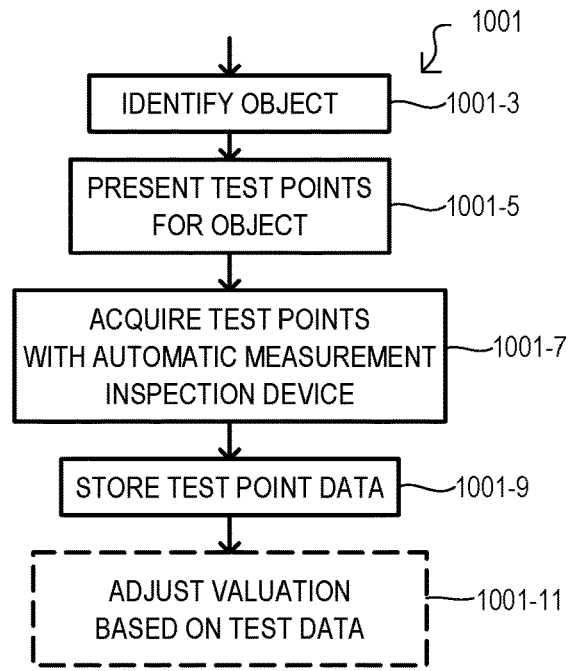
FIG. 10 is a flow diagram showing an application/method according to an embodiment.

FIG. 10 shows an application and method 1001 according to an embodiment. An application 1001 can take the form of machine readable instruction executable by one or more processors of an inspection device, such as any of those described herein, or equivalents. An application 1001 can include identifying an object 1001-3. Such an action can include any of various operations. In some embodiments, a user can enter identifying information for the object in an inspection device. In other embodiments, a user can select an inspected device from a list or series of menus. In further embodiments, a user can use an inspection device to automatically identify the object. Such automatic identification can include acquiring data from an object identification device, acquiring data emitted by the object itself, or capturing an image of the object with the inspection device and having image recognition software identify the object, to name only a few. Image recognition software can be resident on an inspection device, or on a computing system remote from an inspection device.

An application 1001 can present test points for an object 1001-5. Such an action can include presenting data on a display of an inspection device which indicates where a measurement device should contact the object to be inspected. In some embodiments, such displayed data can include text, however, in other embodiments such displayed data can include an image of the object to be inspected, with indications of the location of test points on the object. As will be shown in more detail below, in some embodiments this can include an augmented reality application which can overlay test point locations on an inspected object as it is viewed. In some embodiments, presenting test points 1001-5 can also include indicating a type of measurement device (e.g., ultrasonic, eddy-current, magnetic) for a given test point.

Application 1001 can further include acquiring test points with an automatic measurement inspection device 1001-7. In some embodiments, such an action can include placing an appropriate measurement device at the indicated test point and allowing a measurement to be automatically made. In very particular embodiments, this can include placing a measurement tool at various locations of an automobile and taking a paint thickness measurement at each such location. Acquiring test points can be accomplished by a person, or by machinery (e.g., robot).

An application 1001 can store test point data 1001-9. Such an action can include any of, storing the test point data in volatile and/or nonvolatile memory of the inspection device and/or storing the test point data in a memory device attached to the inspection device. In addition or alternatively, such an action can include transmitting the test data for storage in another computing system (e.g., server), via a wired or wireless connection.

Optionally, an application 1001 can adjust a valuation of the inspected object based on the test point data 1001-11. In some embodiments, such an action can be by a valuation application executed on an inspection device. However, in other embodiments, such an action can be executed on another computing system (e.g., server) remote from the inspection device.

According to some embodiments, an inspection device can include a tool for projecting light, such as a laser. Such a tool can be used to identify, measure, or otherwise indicate areas of interest on an inspected object. An inspection device can then take a picture with the indication to document the area of interest.

Figure 11A:
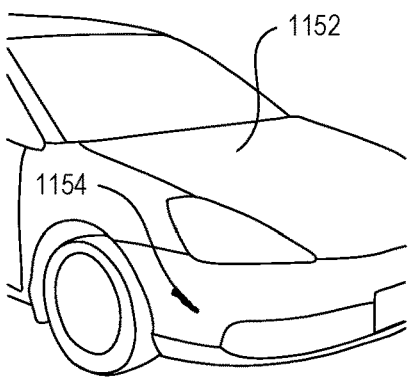
FIGS. 11A and 11B are diagrams showing how areas of interest on an object can be indicated by an inspection device, according to embodiments.
Figure 11B:
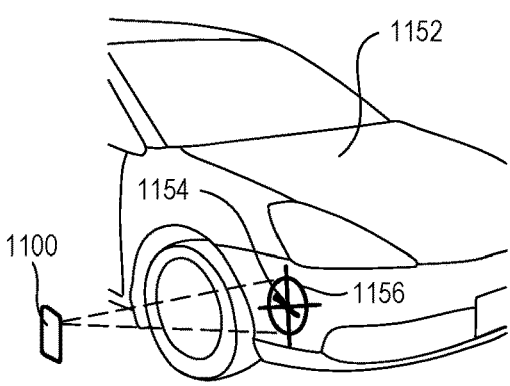

FIGS. 11A and 11B are a series of views showing the identification of an area of interest on an inspected object. FIG. 11A shows an inspected object 1152, which in the embodiment shown, can be an automobile. Object 1152 can include an area interest 1154, which can be a damaged area, defect, or similar region. FIG. 11B shows a projection 1156 which can be made by an inspection device 1100 at the area of interest. It is understood a projection 1156 can take any suitable form, including but not limited to a point, a line, or a more complex object, such as a reticle.

Figure 12:
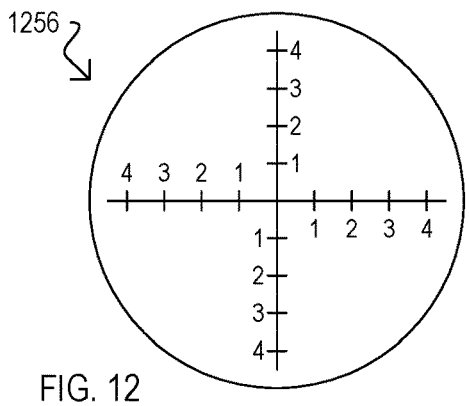
FIG. 12 is a diagram showing one example of an indicator that can be generated by an inspection device.

FIG. 12 shows a projection 1256 that can be included in embodiments. Projection 1256 can be generated by an inspection device, and can include measurement markings to provide scale to a region of interest. In some embodiments, a range finder of an inspection device can be used to adjust a size of projection 1256 to ensure proper scale. In other embodiments, a projection 1256 may come into sharper focus when it is at a proper scale.

Figure 13:
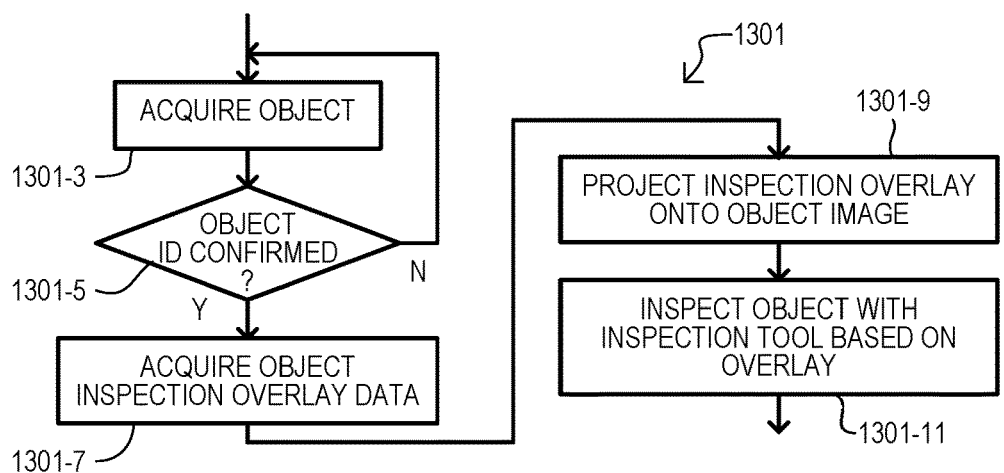
FIG. 13 is a diagram of an application/method according to another embodiment.

FIG. 13 shows an application and method 1301 according to another embodiment. An application 1301 can take the form of machine readable instruction executable by one or more processors of an inspection device, such as any of those described herein, or equivalents. An application 1301 can be an augmented reality application that projects inspection data onto an image of an object being inspected, or onto a view of an object being inspected.

Application 1301 can include acquiring an object 1301-3. In some embodiments, this can include acquiring image and/or location data for an object. As but one example, an imaging device of can be pointed at a desired object. In a very particular embodiment, an imaging device can be pointed at an automobile.

Based on such image data, an object's identification can be confirmed 1301-3. In some embodiments, this can include presenting, on a computing device, one or more object identification selections. In particular embodiments, this can include image data being analyzed by remote servers to determine an object being imaged. In very particular embodiments, image data can be processed by a remote artificial neural network system to identify an automobile. In other embodiments, a user (e.g., inspector) can enter data into a computing device to identify the object, and/or a user scan an object identification device, and/or data transmitted from the object can be received by an inspection device. If an object identification cannot be confirmed (N from 1301-5), the object can be reacquired.

If the object can be confirmed (Y from 1301-5), object overlay data can be acquired. Such an action can include such overlay data being recalled from memory of an inspection device, and/or overlay data being received from a system remote from the inspection device. According to embodiments, overlay data can be linked to the object identified. That is, overlay data that is acquired can be based on the object identification.

Overlay data can be projected onto an image of the object to be inspected (or a view of the object to be inspected) 1301-9. In some embodiments, this can include projecting inspection points onto an image of an object in a display. In other embodiments, overlay data can be projected over a view of the object to be inspected. In particular embodiments, this can include projecting inspection points onto an automobile based on the automobile identification data. In some embodiments, the overlay data can be projected onto an image on the inspection device. In addition or alternatively, the overlay can be projected onto an image of a device different than the inspection device. In such an arrangement, one device indicates inspection points with overlay data, while the inspection device is used to acquire inspection data at the locations indicated by the overlay data.

An application 1301 can further include inspecting the object based on the overlay data 1301-11. Such an action can include an inspection device making one or more readings at points indicated by the overlay data. In particular embodiments, such an inspection can be done according to any of the techniques described herein, or equivalents.

Figure 14A:
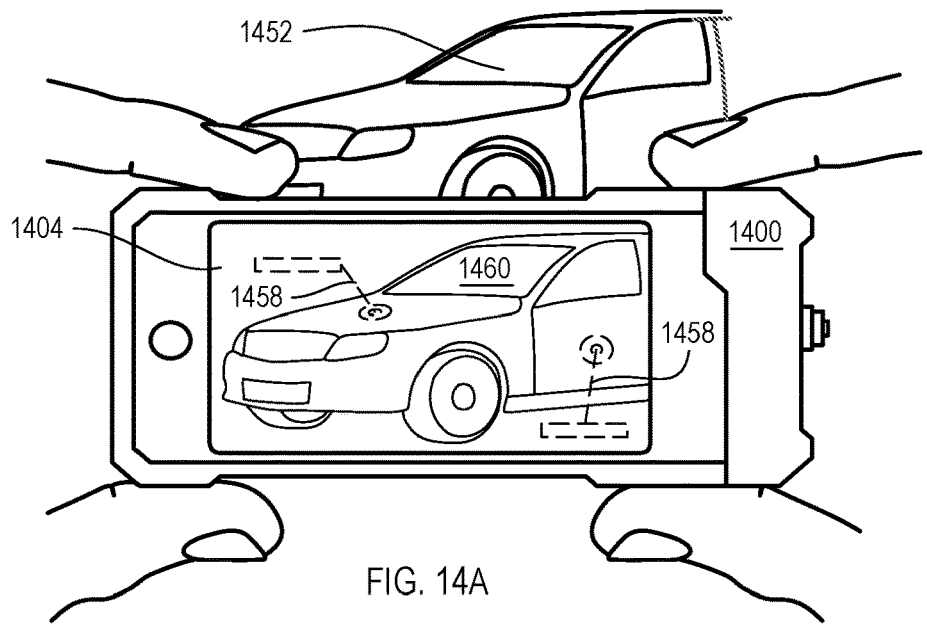
FIGS. 14A and 14B are diagrams showing how an inspection device can utilize augmented reality in an inspection operation.

FIG. 14A is a diagram showing an inspection device, operation and application according to embodiments. An image 1460 of an object to be inspected 1452 can be captured by an inspection device 1400 and presented on a display 1404 of the inspection device. Overlay data 1458 can be projected onto the image 1460. Based on the image locations indicated by overlay data 1458, the inspection device 1400 can be used to acquire inspection data.

Figure 14B:
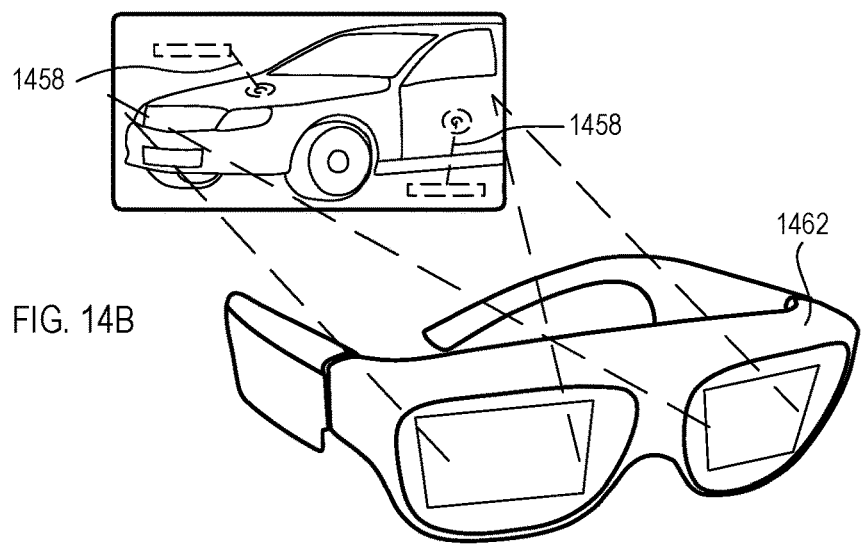

FIG. 14B is a diagram showing how overlay data can be projected onto an image of a viewing device 1462 other than an inspection device. An inspector can wear/use the viewing device 1462 to identify inspection points, and then acquire data at such inspection points with an inspection device as described herein, or equivalents. Accordingly, viewing device 1462 can include a display 1404-0/1 through which an object to be inspected can be viewed, and on which overlay data 1458 can be presented. Such projection of inspection can utilize any suitable augmented reality device and/or application.

In some embodiments, once inspection data has been acquired at an inspection point, the overlay data corresponding from the inspection point can be removed from the image.

Figure 15A:
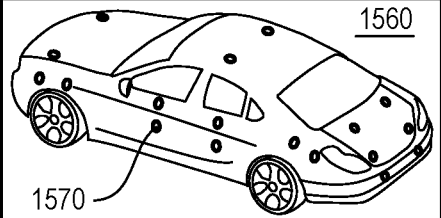
FIGS. 15A and 15B are diagram showing an inspection operation according to one very particular embodiment.
Figure 15B:
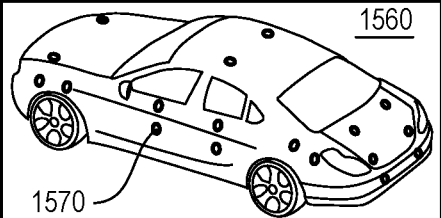

FIGS. 15A and 15B show one example of how test points can be presented in an application and method, and a valuation adjusted according to one very particular embodiment. In some embodiments, some or all of such data can be presented on an inspection device by an application, as noted herein, or equivalents. FIG. 15A shows an application 1568 (and/or application data) prior to an inspection. FIG. 15B shows an application 1568' (and/or application data) after an inspection has been performed on the object.

Referring to FIGS. 15A and 15B, an inspected object can have various regions (trunk, roof, right quarter panel, etc.) which can have one or more test locations (one shown as 1570) for an inspection device. Test locations 1570 can be presented on an image 1560 of the object to be inspected. Image 1560 can be generated by, or provided to, an inspection device, or can be an image of an object currently being acquired by an inspection device. Further, an inspected object can have a base value (in this example shown, a wholesale and retail value).

Referring to FIG. 15A, application 1568 can have data entry locations for the various test locations 1570 (e.g., Trunk, Roof, Right Quarter, etc.). In the embodiment shown, application 1568 can also include data entry locations related to the inspection itself. In the embodiment shown, such data entries and include an inspector, a date and time, and an inspection type. It is noted that the vehicle data (image, inspection regions, inspection points) can be loaded into an inspection device from a remote location, or can be resident on the inspection device.

Referring to FIG. 15B, an application 1568' can receive and/or acquire data for its various entries. While data related to the inspection (e.g., inspector, time/day) can be entered by an inspector, in some embodiments, such data can be acquired with an authentication tool as described herein. Data and time data can be acquired by a program (e.g., operating system) of the inspection device. An inspection type can be selected by an inspector, or types of inspection can be limited according to a particular inspector, or selected automatically by an application.

Referring still to FIG. 15B, measurement values can be obtained according to embodiments described herein or equivalents. In the embodiment shown, measurements can be paint thickness measurements. As shown in FIG. 15B, some measurements are outside of a predetermined range, and thus can result in adjustments to a value of the object. In the example shown, one adjustment 1572-0 can result in a lesser devaluation, while another adjustment 1572-1 can result in a greater devaluation. In particular, smaller variations 1572-0 can result in a 2% reduction in value, while larger variations 1570-1 can result in a 5% reduction in value. It is understood that a valuation algorithm can have any suitable weighting and adjustment, and the one shown is provided by way of example only.

An algorithm which generates an end value based on inspection data can reside on the inspection device, or can reside remotely (on a server), with the remote device pushing the value result back to the inspection device.

In this way, an application or method can provide a consistent, objective way evaluating an object, based on measured data. Such an application or method can identify automobiles on an incoming inspection that may have been more damaged than they appear. At the same time, automobiles that may have only cosmetic damage, can placed into an inventory, when others might discard such automobiles.

While embodiments can include inspection device, applications and methods, other embodiments can include inspection systems for evaluating and tracking groups of objects (e.g., fleets of automobiles).

Figure 16:
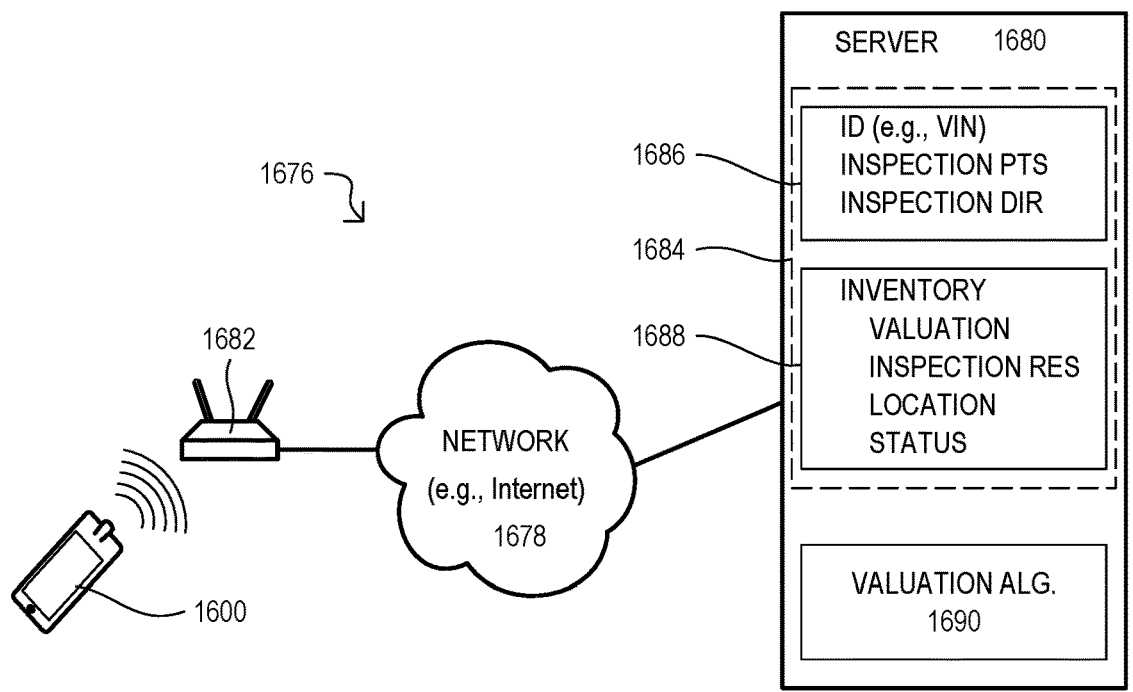
FIG. 16 is a diagram of a system according to an embodiment.

FIG. 16 shows a system 1676 according to an embodiment. A system can include one or more inspection devices 1600, a communications network 1678, and one or more computing systems 1680. Optionally, a system 1676 can include an intermediate device (e.g., router, switch) 1682. Inspection devices 1600 can take the form of any of those shown herein, or an equivalent. Inspection devices 1600 can acquire test data for inspected objects as described herein, or equivalents. Inspection devices 1600 can communicate via communication network 1678 with computing system(s) 1680, directly, and/or by way of intermediate device 1682.

A communication network 1678 can be any suitable network, including but not limited to the Internet, a vpn, a LAN, WLAN, or cellular network, as but a few examples.

In the particular example of FIG. 16, a computing system 1680 can be a server, which can include a database 1684 which can store object data 1686 and inventory data 1688. Object data 1686 can include data which can be used by inspection devices (e.g., used by applications running on such devices). Such provided data can be related to objects to be inspected. As but one particular example, such data can include data for an application like that shown in FIGS. 15A/B. In some embodiments, such provided data can be loaded onto an inspection device based on the identification of the object to be inspected.

Inventory data 1688 can include data for multiple inspected objects, including any test data generated by inspection devices related to the objects. Such data can be updated as objects are added and removed from inventory, and make their way through a processing flow (e.g., from initial acquisition to final disposition). Such data can be loaded onto an inspection device upon request. In some embodiments, inventory data 1688 can be a database. In one very particular example, inventory data 1688 can include any or all data shown in any of FIGS. 15B and/or 20.

In some embodiments, a computing system 1680 can include a valuation algorithm 1690, as described herein or equivalents. Inspection data can be loaded from an inspection device to computing system 1680, and the computing system 1680 can generate a valuation result. As noted herein, in addition or alternatively, the inspection device 1600 itself can include a valuation algorithm 1690.

Embodiments can also include an inspection application installed on an inspection device, and a method executed by the inspection device. Such an application/method can be a set of machine readable instructions stored on the inspection device and executable by processors of the inspection device. According to embodiments, an application can work alone, or in combination with one or more remote devices (e.g., servers).

In particular embodiments, an application/method can have two modes of operation: (1) inspection and (2) tracking. In an inspection mode, a user can generate inspection data with the inspection device as described herein or equivalents. In particular embodiments, an application/method can include a user taking measurements at various test points of an object (automobile) with the inspection device to generate a data set for the inspected object.

In a tracking mode, an application/method can include an inspection device communicating with other components of a system, to perform any of all of the following: (1) Locate the object (e.g., a car's location). In some embodiments this can include an application/method communicating with a system that knows the object's location through an object identification device (e.g., dongle). (2) Identify an object (e.g., stock number). In some embodiments this can include an application/method communicating with an object identification device. (3) Produce vehicle information (e.g., price, options). In some embodiments this can include an application/method communicating with a system database. However, in other embodiments, all or a portion of the database can reside on the inspection device itself. (4) Produce status information for the object (e.g., for retail, in service, being reconditioned, for wholesale). In some embodiments this can include an application/method communicating with a system database. However, in other embodiments, all or a portion of the database can reside on the inspection device itself. (5) Identify alerts regarding the object (e.g., battery low, gas level, check engine light on). In some embodiments this can include an application/method communicating with a dongle and/or with a system database. However, in other embodiments, all or a portion of the database can reside on the inspection device itself. (6) Identify the last person to interact with the object (e.g., last one to start/drive an automobile). In some embodiments this can include an application/method communicating with a dongle and/or with a system database. However, in other embodiments, all or a portion of the database can reside on the inspection device itself.

Embodiments can also include applications/methods for automatically evaluating an object based on inspection data. In some embodiments, an object can have multiple regions that can be inspected by an inspection device. Each region can have tolerances or other levels that indicate whether the region has been changed from the original manufactured condition.

In particular embodiments, an application/method can include applying a paint meter on an inspection device to measure a paint thickness for various regions of an automobile. If any regions vary, they can contribute to changing (e.g., lowering) a value of the automobile. Further, the amount by which a region varies, can increase or decrease according to how much the measured value varies from predetermined values.

Figure 17:
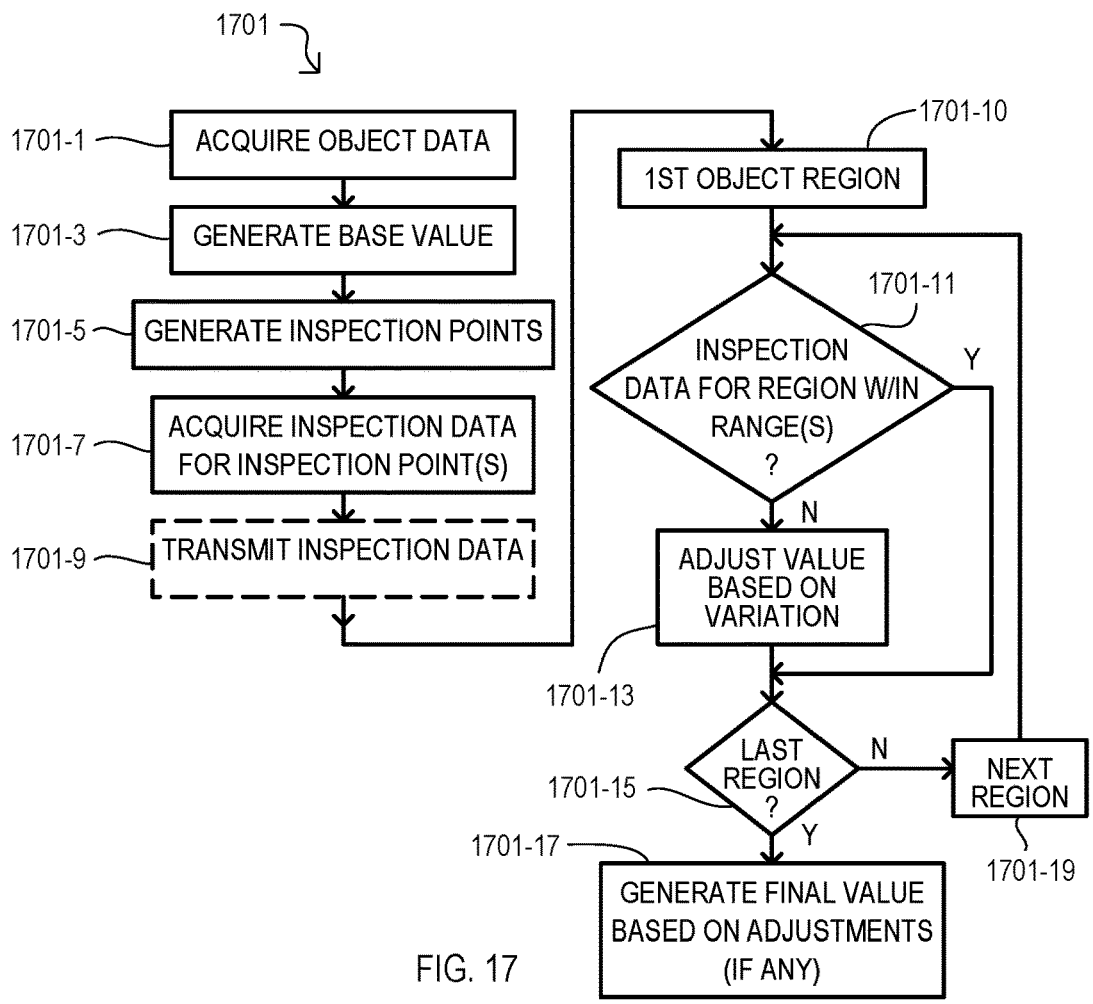
FIG. 17 is flow diagram of an application/method according to another embodiment.

FIG. 17 shows an inspection and valuation method/application 1701 according to one particular embodiment. All or a portion of the method can be executed by a user with an inspection device. In some embodiments, one portion (i.e., 1701-1, 1701-5 to 1701-9) can be executed by an application running an inspection device, while the other portion (i.e., 1701-1 to 1701-3 and 1701-10 to 1701-19) can be executed on another computing device (e.g., server). It is noted that the method shown is provided by way of example, and should not be construed as limiting.

A method 1701 can include acquiring object data 1701-1. Such an action can include acquiring data on an object to be inspected according to any of the embodiments described herein, or equivalents. A base value can be generated for the object 1701-3. Such an action can include a computing system (e.g., server) or inspection device accessing a resident database, or external commercial database (e.g., Bluebook) to establish a base value for an object.

Inspection points can be generated for the object 1701-5. Such an action can include an inspection device retrieving inspection point data for an object from a local source, or a remote source (e.g., server). Alternatively, such an action can have been performed previously for given object and stored for access. A method 1701 can acquire inspection data for inspection points 1701-7. Such an action can include using an inspection device as described herein, or equivalents.

Optionally, inspection data can be transmitted 1701-9. Such an action can occur in embodiments in which a valuation algorithm resides on a remote computing device (e.g., server). For embodiments where a valuation algorithm resides on an inspection device, such an action may not be included.

A method 1701 can then cycle through inspected regions of an object, and determine if inspection data for such regions are within predetermined ranges. Based on such a determination, a value of the object can be adjusted (see 1701-10 to 1701-19). A method 1701 can then generate a final value for the object based on determinations made for all regions of the object 1701-17.

Figure 18:
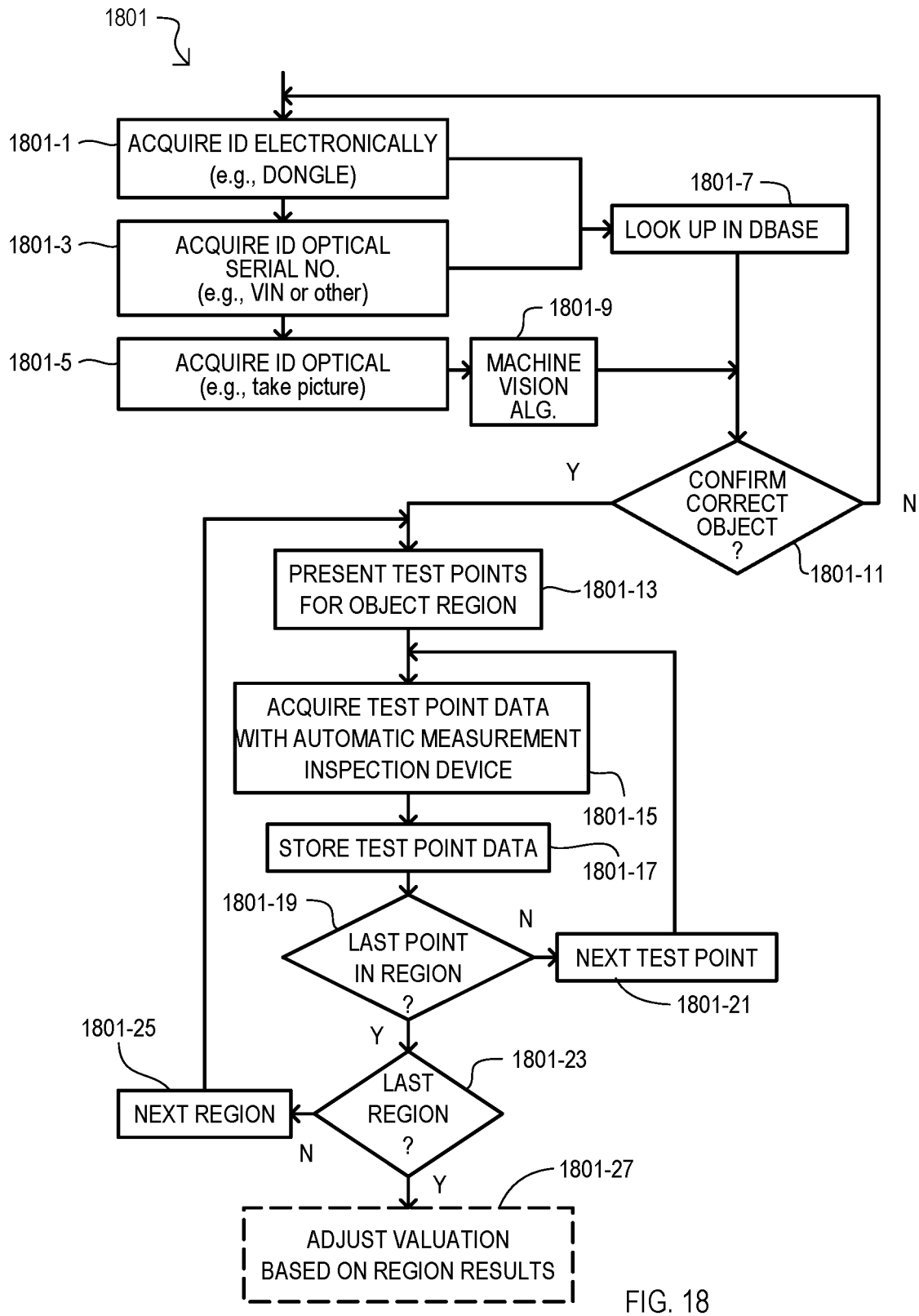
FIG. 18 is flow diagram of an application/method according to another embodiment.

FIG. 18 is a diagram showing an inspection method 1801 according to another embodiment. All or a portion of such a method 1800 can be executed on an inspection device as described herein, or equivalents. A method 1801 can include identifying an object in any of various ways, including but not limited electronically 1801-1 (e.g., by an attached dongle communicating wirelessly with an inspection device). It can be identified optically by an identifying tag 1801-3 (e.g., the application can derive the VIN from a picture of the VIN). In some embodiments, it can be identified optically from a picture of the object 1801-5 (e.g., a picture of the object can be processed by a machine vision system 1801-9, or the like, having a database of algorithm for identifying objects).

Once an object is identified it can be looked up in a database 1801-7 (e.g., make, model, year). In some embodiments, a method 1801 can include requesting that a user confirm it is the right object 180-11. If not confirmed (N from 1801-11), identification of the object can be attempted again. If the object is confirmed (Y from 1801-11), an object can be inspected.

In the particular embodiment shown, inspection can occur on a region by region basis. Test points for an object region can be presented 1801-13. Test point data can be acquired with an automatic measurement of an inspection device 1801-15. Such test point data can be stored 1801-17. Regions can be tested until all regions have been tested (see 1801-19 to 1801-25). Optionally, a valuation of an object can be adjusted based on results of data for the various object regions 1801-27. Such various actions can be according to other embodiments herein, or equivalents.

Figures 19A, 19B:
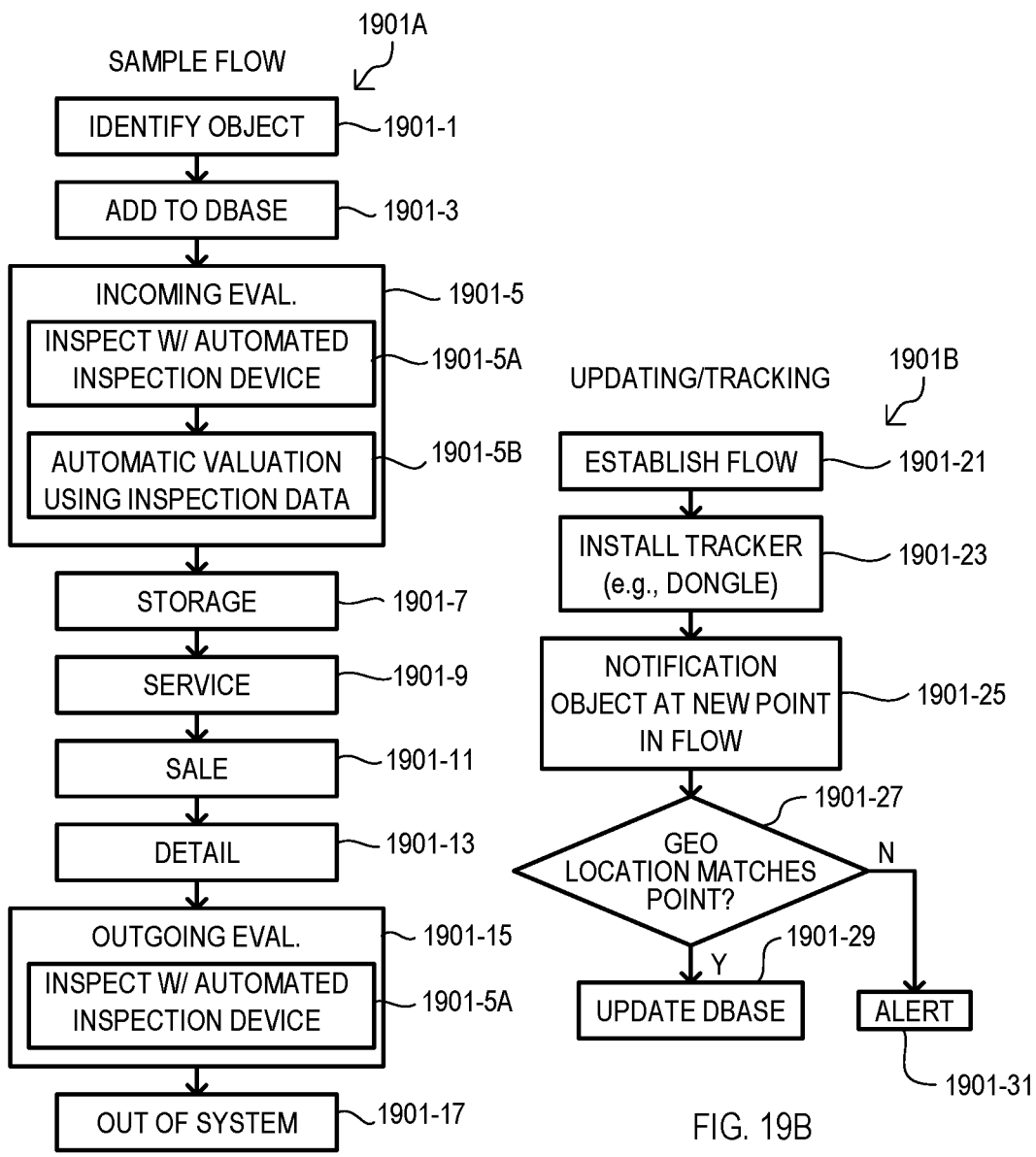
FIGS. 19A and 19B are diagrams showing additional methods according to embodiments.

FIG. 19A shows object monitoring flow applications/methods 1901A according to particular embodiments. Application/methods 1901A shows how an object can be added to an inventory system and then finally transferred out of the inventory system. An application/method 1901A can include identifying an object 1901-1. Such an action can according to any of the embodiments herein or equivalents, including using an inspection device. Upon being identified, the identified object can be added to a database 1901-3. In some embodiments this can include storing the object data in an inspection device. In addition or alternatively, this can include transmitting the object data to another computing device (e.g., server).

The object can then be subject to an incoming evaluation 1901-5. An incoming evaluation 1901-5 can include an inspection with an inspection device 1901-5A to generate inspection data as described for any embodiments herein, or equivalents. Based on such an inspection data, an automatic valuation of the object can be performed 1901-5B. Such an action can be according to any embodiments herein, or equivalents, including by the inspection device and/or another computing device (e.g., sever). Once an object has been entered into a system, inspected, and automatically valued, the object can be subject to various other actions resulting in relevant "points" in a flow. In the particular embodiments shown, such points can include storage 1901-7, service 1901-9, sale 1901-11, and detail 1901-13. Such points can be associated with the object, and result in a change/update for data associated with the object. Thus, when object data is accessed by an application running on an inspection device, or some other device, the location/status of the object can be known.

Referring still to FIG. 19A, in the embodiment shown, before objects are subject to final disposition (e.g., retail/wholesale sale, or other) there can be final inspection 1901-15. Such a final inspection can employ an inspection device, which can ensure the outgoing state of the object adequately corresponds to the object received, or otherwise is in an expected condition. Such a final inspection can include any of the inspection approaches shown herein, or an equivalent. However, in particular embodiments, an outgoing evaluation can have fewer test points, as it is only meant to confirm initial test points or that changes in test point data are expected.

An object can then exit a tracking system 1901-17.

FIG. 19B shows a method 1901B for tracking an object in a system, such as that shown in FIG. 19A. An application/method 1901B can operate in an existing flow 1901-21 (e.g., such as that shown in FIG. 19A). A method 1901B can include installing a tracker 1901-23, such as an object identification device as described herein or an equivalent, on an incoming object. In particular embodiments, this can include installing a dongle in an automobile.

Once a tracker is installed on the object, when the object arrives at a new point in the flow, a notification can be generated 1901-25. Such an action can include updating a database. In some embodiments, such an action can also include indicating such changes via an inspection device in communication with the tracker.

In the embodiment shown, a tracker can include geolocation capabilities. As a result, a change in status can be compared with an expected geolocation 1901-27. If a geolocation does not match a current point in the flow (N from 1901-27), an alert can be generated 1901-31. If a geolocation matches a current point in the flow (Y form 1901-27), a database can be updated 1901-29.

According to some embodiments, a system can periodically go through all items in an inventory and compare geolocation to point in a flow, and generate alerts in the event of any discrepancy.

FIG. 20 is a diagram of a database that can created, modified and/or accessed by applications according to embodiments. In particular embodiments, such a database can be created all or in part with an inspection device as disclosed herein, or equivalents. A database can include an inventory of objects (in this example, automobiles) having a valuation adjustment that is based, at least in part, on inspection data from an inspection device. In some embodiments, a database can be generated in conjunction with object identification devices (e.g., dongles).

In the particular embodiment shown, database can include vehicle identification information (e.g., Stk #, make/model) as well as status information for the object as noted herein (e.g., book value, battery, gas, check engine, last start, etc.). Status information is shown by three different circle types.

In addition, database of FIG. 20 can include data generated from an inspection including any of: (1) an Alert: indicating an overall result of an inspection (in this case three types shown by different circle types); (2) an Adjustment (ADJ): indicating the automatic price adjustment resulting from the inspection data (in this case, a percentage); (3) a Price: indicating the resulting price, which can reflect a discount resulting from the adjustment.

In some embodiments, a database like that of FIG. 20 can be viewed on an inspection device and/or by accessing another computing system (e.g., server).

Figure 21:
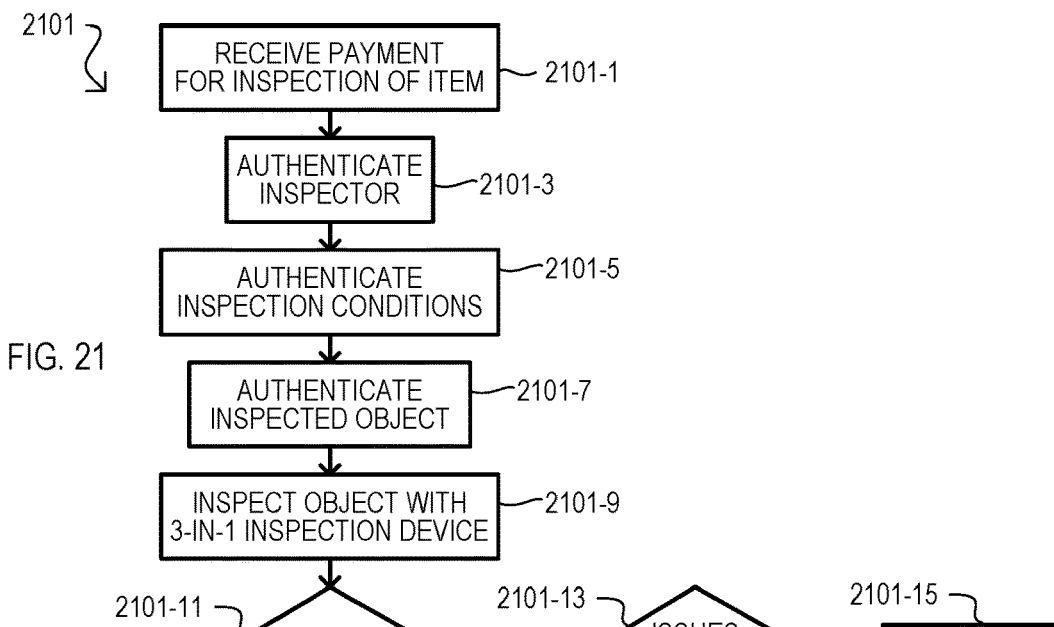
FIG. 21 is flow diagram of a method according to another embodiment.

FIG. 21 is a flow diagram showing a method 2101 according to another embodiment. A method 2101 can include using inspection data to automatically generate a value indication of an object, including a discount for objects that have been determined to have been altered. A method 2101 can include receiving payment for inspection of an item 2101-1. In particular embodiments, such an action can include receiving payment for inspecting an item and, based on the inspection, issuing a guarantee for the item.

A method 2101 can include authenticating an inspector 2101-3. In some embodiments this can include authenticating a person employing an inspection device to inspect an object. In such cases, such an action can include utilizing any suitable authentication methods as described herein or equivalents. In particular embodiments, this can include utilizing biometric authentication, or other authentication methods. Alternatively, it can include a device (e.g., robot) identifying itself. A method 2101 can include authenticating the inspection conditions 2101-5.

Such an action can include any of: recording a time, date and location of an inspection and verifying proximity to an inspected object. Such actions can include timestamping data (photographs), using GPS or similar capabilities of an inspection device that can indicate inspection device was proximate to an inspected object. Such an action can further include recording data from an inspected object. In particular embodiments, this can include recording data signals from the inspected device (device emits signals), or an object identification device attached to the inspected device (e.g., OBDII dongle).

An object can be inspected by an inspection device 2101-9. Such an inspection device can be any of those described herein or an equivalent. In the embodiments shown, an inspection device can be a 3-in-1 device. If an inspection indicates the object has been altered or reveals other issues (Y from 2101-11), a determination can be made as to the extent of the alterations/issues (2101-13). If the alterations/issues exceed a threshold (Y from 2101-13), no guarantee may be issued 2101-15. If the alterations do not exceed a threshold (N form 2101-13), a discount value can be automatically generated based on acquired inspection data (2101-17). Such an action can include any of the valuation methods/applications shown herein or equivalents. If an inspection indicates the object has not been altered or has no issued (N from 2101-11), or a discount has been calculated, the object (e.g., item) can be available for purchase.

If the item is purchased (Y from 2101-19), inspection data and authentication data for the device can be retained (2101-23, 2101-25). Such inspection/authentication data can be associated with a guarantee 2101-27, and the guarantee can be issued for the item 2101-29.

In this way, an object valuation can be based on physical inspection data which can include authentication data tying the inspected object, inspection conditions, and inspecting person or device, to the inspection data. In the case of automobiles, such an approach can provide an objective valuation that does not rely on third party reports, or some subjective examination which can vary between different objects and/or inspectors.

Figure 22:
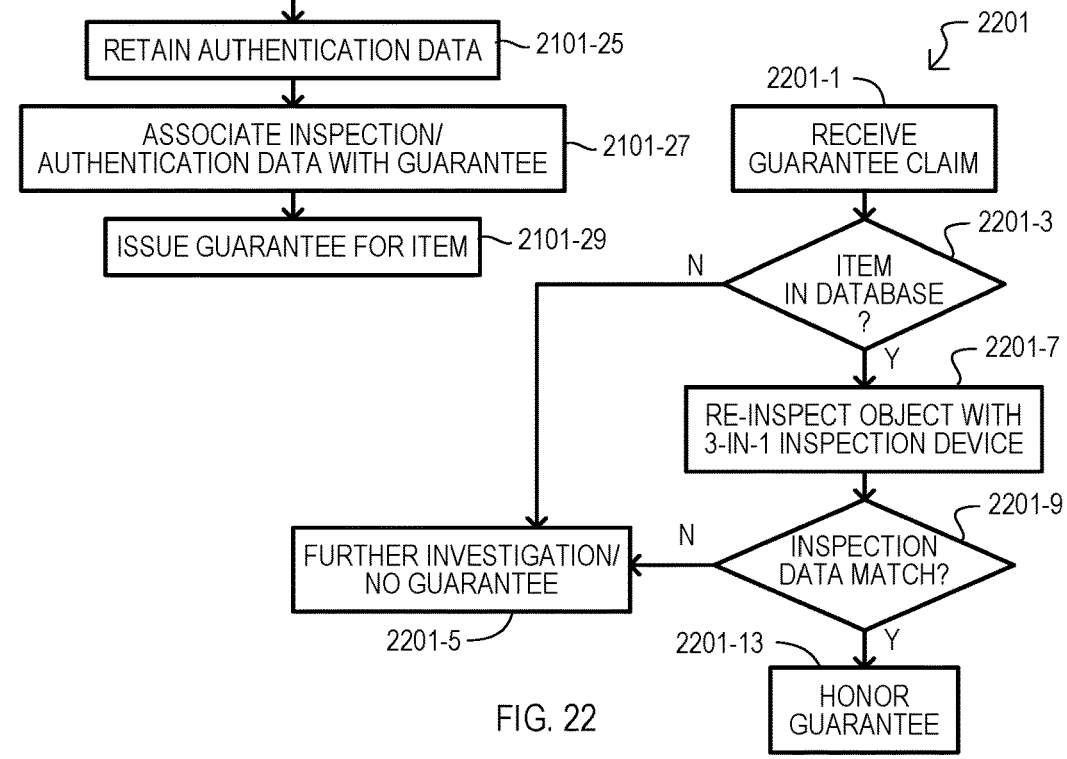
FIG. 22 is flow diagram of a method according to another embodiment.

FIG. 22 is a flow diagram of another method 2201 according to an embodiment. A method 2201 can include receiving a guarantee claim for an item 2201-1. If the item is in a retained database (Y from 2201-3), the item can be re-inspected using an inspection device as described herein or equivalents 2201-7.

If the inspection data generated by the reinspection is determined to be a sufficient match for previous inspection data acquired for the item (Y from 2201-9), the guarantee can be honored 2201-13.

If the item is not in a database (N from 2201-3) or reinspection data does not sufficiently match data in database (N from 2201-9), further investigation can be conducted and/or the guarantee may not be honored 2201-5.

Figure 23A:
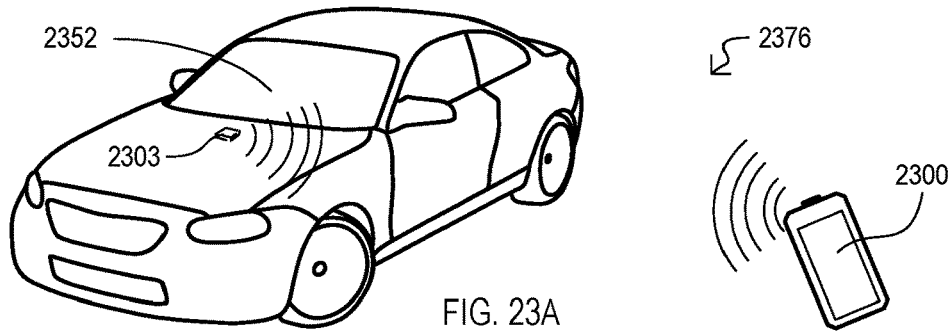
FIGS. 23A and 23B are diagrams showing systems and operations according to an embodiment.
Figure 23B:
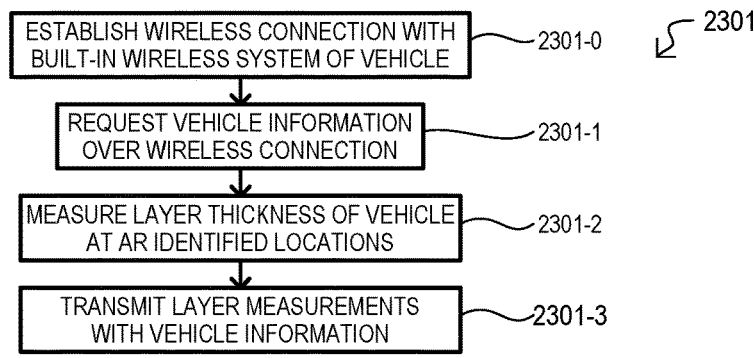

FIGS. 23A and 23B are diagrams showing a system and operations according to embodiments. FIG. 23A shows a system 2376 that includes an inspection device 2300 and an inspected object 2352 (e.g., automobile). An inspected object 2352 can include a built-in wireless system 2303 which can provide wireless communications according to one or more suitable protocols (e.g., WiFi, cellular, Bluetooth).

FIG. 23B is a flow diagram of a method 2301 can be executed by an inspection device 2300 like that of FIG. 23B. A method 2301 can include establishing a wireless connection with a built-in wireless system of a vehicle 2301-0. Such an action can include detecting signals from the built-in wireless system, and following a predetermined protocol (e.g., security protocol). Vehicle information can be requested over the wireless connection 2301-1. Such an action can take the form of any of that described herein and equivalents, and can include requesting any suitable data transmitted on data buses internal to the vehicle, including but not limited to serial data buses (e.g., CAN-type buses) as well as other bus types (e.g., data over power type buses). Accordingly, in some embodiments, a built-in wireless system of an inspected object can provide data the same as, or equivalent to, that provided by OBD-type dongles as described herein.

A method 2301 can include measuring layer thicknesses of a vehicle at locations identified with an augmented reality (AR) device/application 2301-2. Layer measurement data and vehicle information can be transmitted from an inspection device 2301-3. Such actions can include any of those described herein or equivalents.

Figure 24:
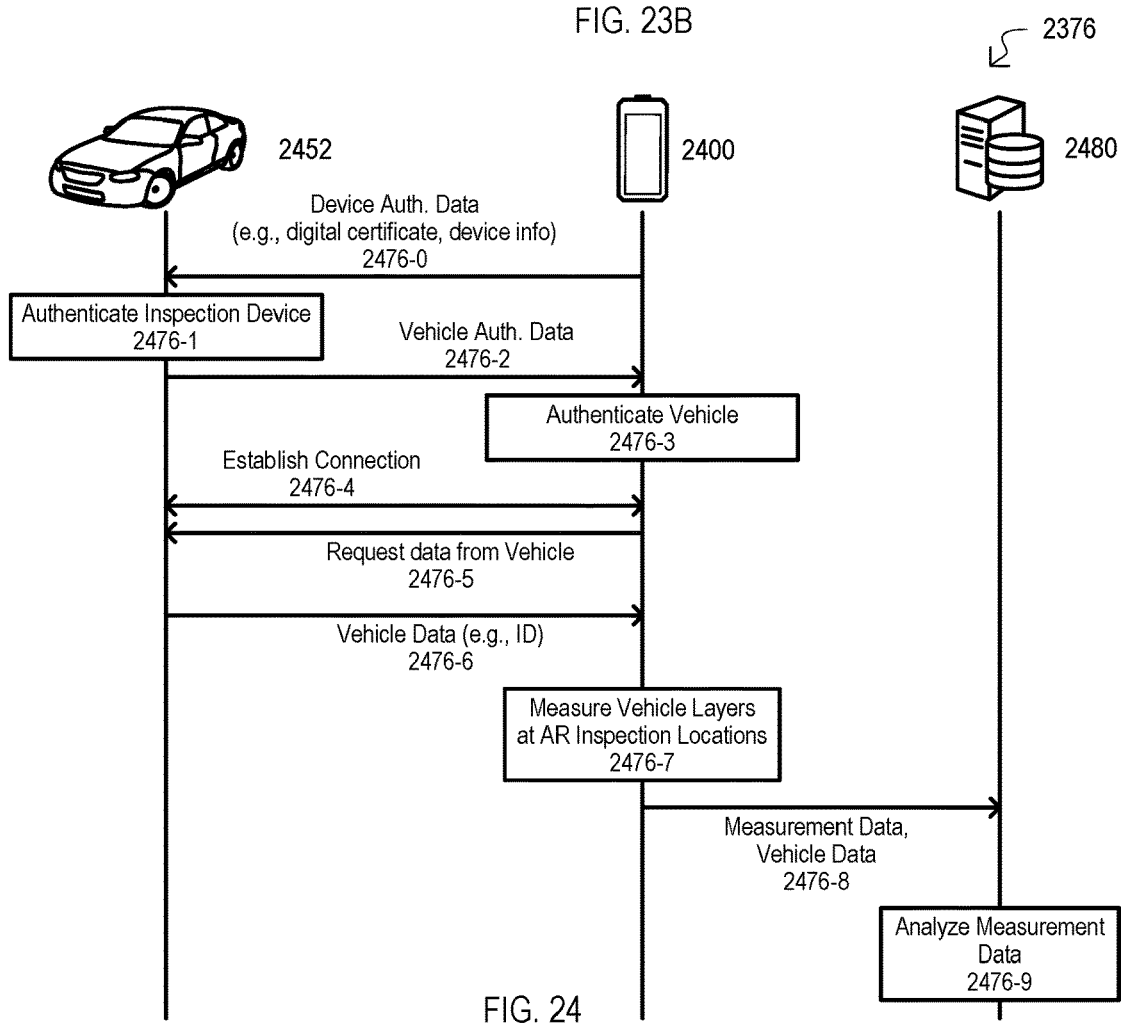
FIG. 24 is a diagrams showing a system and operations according to another embodiment.

FIG. 24 is a diagram of a system and operations according to another embodiments. FIG. 24 shows a system 2376 that includes an inspected object (e.g., vehicle) 2452, inspection device 2400 and server system 2480. An inspected object 2452 can have a built-in wireless system with which an inspection device 2400 can communicate. Thus, in some embodiments a system 2376 may not include a device attachable to an object, such as an OBD-type dongle.

In operation, an inspection device 2400 can be authenticated to the inspected object 2452. An inspection device 2400 can transmit authentication data 2476-0 to an inspected object. Such authentication data can be compatible with any suitable authentication procedure, and in some embodiments can utilize a public key encryption infrastructure, including accessing a digital certificate. In some embodiments, authentication data can include inspection device information stored in a secure memory of the inspection device. In the embodiment shown, the inspected object 2452 can be authenticated to the inspection device (2476-2 and 2476-3).

A connection can then be established between the inspection device 2400 and inspected object 2452. Such an action can include exchanging data according to a predetermined protocol, including tokens, encryption keys, etc. With a connection established, inspection device can request data from the inspected object 2476-6, which in some embodiments can include an identification value. Layers of the inspected object can be inspected at locations indicated by an AR system 2476-7. Such measurement data and object identification data 2476-8 can be transmitted to a server system 2480. A server system 2480 can analyze measurement data 2476-9 as described herein and equivalents.

Figure 25A:
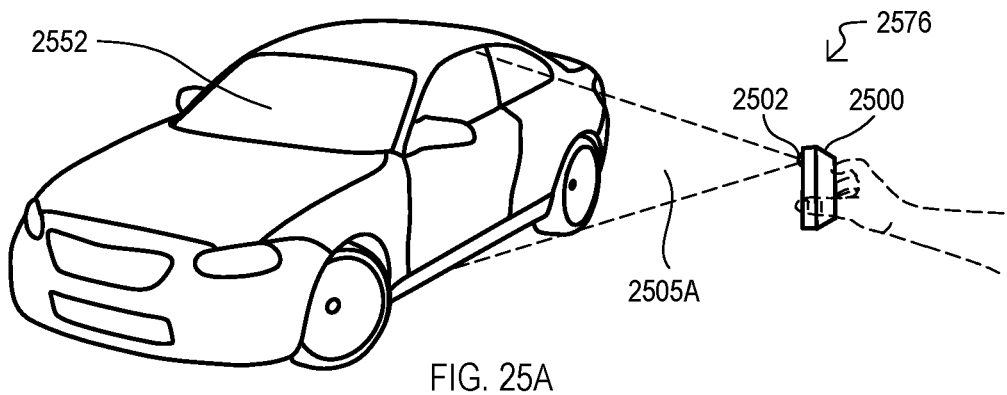
FIGS. 25A to 25C are diagram showing LIDAR measurements that can be included in embodiments.

As noted herein, inspection devices can include LIDAR systems. In some embodiments, such LIDAR systems can be used to measure inspected objects. FIG. 25A shows a system 2576 and operations for an inspection device 2500 having a LIDAR system 2502. A LIDAR system 2502 can be used to scan 2505A an inspected object 2552 to generate LIDAR data for various points of the entire inspected object 2552.

Figure 25B:
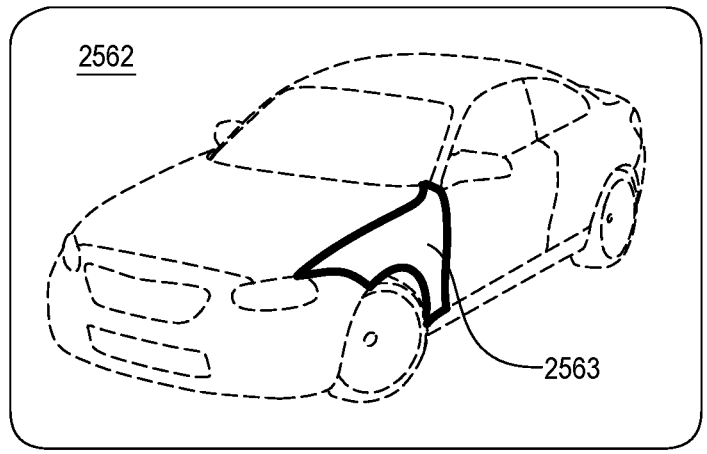
Figure 25C:
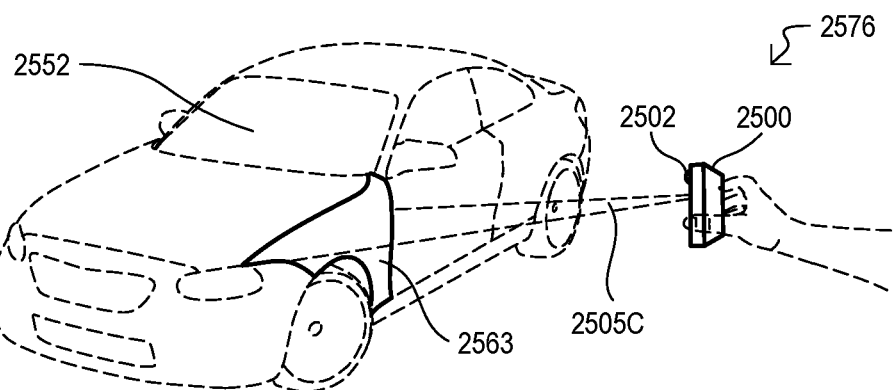

In addition or alternatively, a LIDAR system can be used to scan one part or portion of an inspected object. FIG. 25B shows how an AR display 2552 can identify a part/portion of interest 2463. Using such projected overlay data, as shown in FIG. 25C a LIDAR system can be used to scan the part/portion of interest 2463 identified by the AR system. It is understood that a part/portion can include any suitable part or portion of an inspected object, including but not limited to: panels, parts, bumpers, engine compartment regions, vehicle interior regions, regions of an undercarriage.

Figure 26:
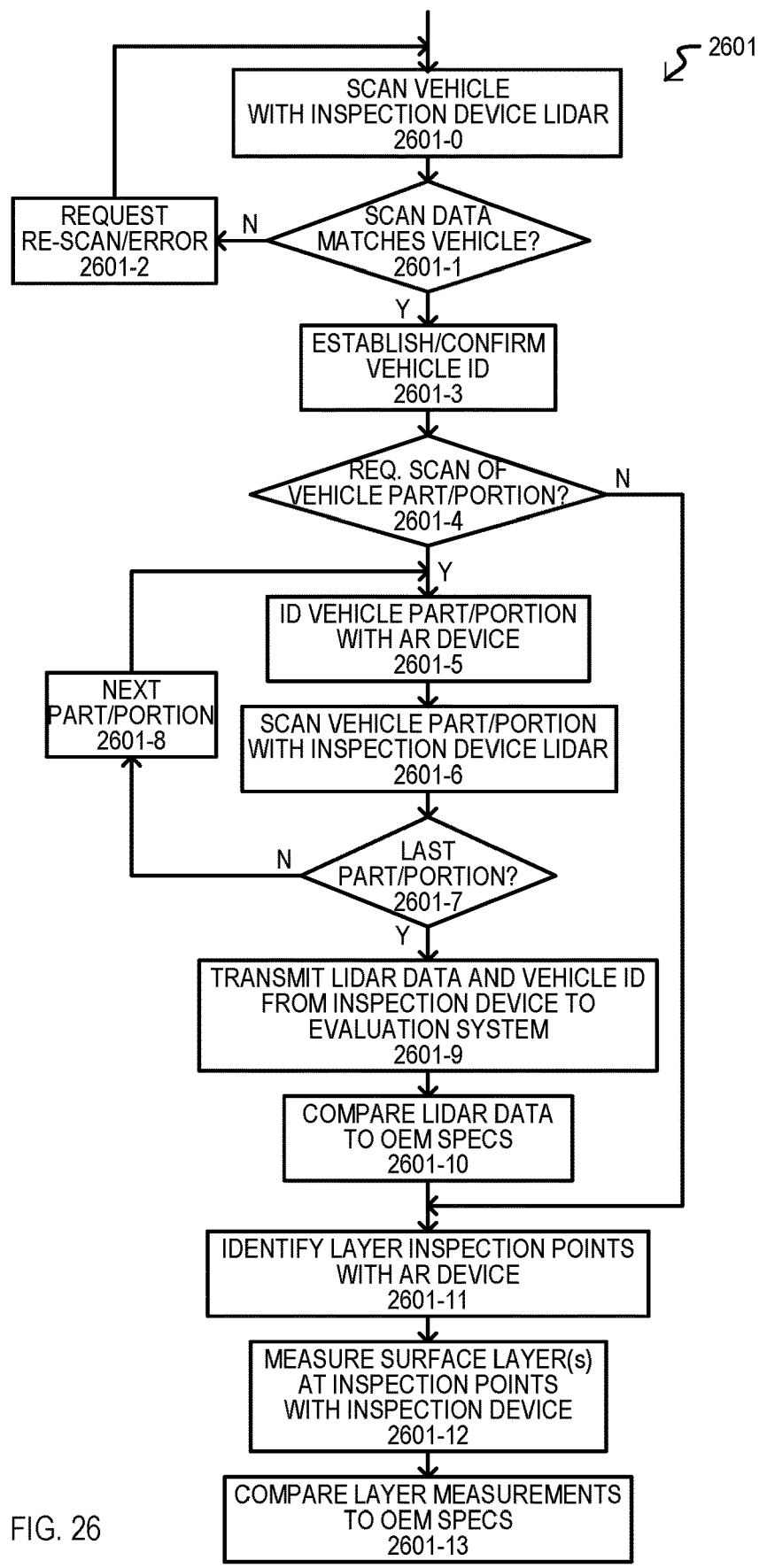
FIG. 26 is a flow diagram of a method according to an embodiment.

FIG. 26 is a flow diagram of a method 2601 according to another embodiment. A method 2601 can include scanning an inspected object (e.g., vehicle) a LIDAR system of an inspection tool 2601-0. LIDAR generated scan data can be analyzed to determine if it matches a known object 2601-1. That is, a LIDAR scan can be used to identify an inspected object. In the example shown, if an object cannot be identified (N from 2601-1), a scan can be requested or an error message generated 2601-2. The identity of the inspected object can be established or confirmed 2601-3. Such an action can rely on LIDAR scan data or also include data received from the inspected object over a wireless connection, or the like.

In the embodiment shown, request can be made to scan a part/portion of the inspected object 2601-4. Such requests can come from any suitable source, including an application or a user of an inspection device. If a part/portion is to be scanned (Y from 2601-4), the part/portion can be identified with an AR device 2601-5. Such an action can include the part/portion being identified with overlay data projected on an image of the inspected object. The part/portion can be scanned with the inspection tool LIDAR 2601-6. Different parts/portions can be identified and scanned (N from 2601-7, 2601-8) until a last part/portion is scanned (Y from 2601-7). LIDAR scan data and vehicle identification values can be transmitted to an evaluation system 2601-9. In some embodiments, such an action can include an inspection device transmitting such data to a server system. LIDAR scan data for a part/portion can be compared to OEM specifications to determine if the scanned part/portion is in or out of spec. In some embodiments, such a determination can be made by a server system.

In the embodiment shown, a method 2601 can also include identifying layer inspection points with an AR device 2601-11, measuring one or more surface layers at the inspection points with an inspection tool 2601-12 and comparing layer measurements to OEM specs 2601-13. Such actions can take the form of any of those described herein or equivalents.

As noted herein, inspection tools according to embodiments can include any suitable paint measurement sensors. One such sensor can be a terahertz (THz) type sensor. A THz type sensor can sense layers using bursts of electromagnetic waves in the range of 0.1 to 10 THz. In some embodiments, a THz type sensor can provide for contactless sensing.

Figure 27A:
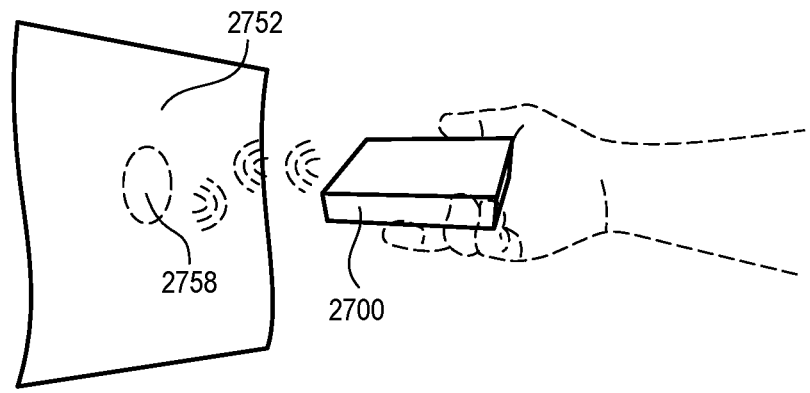
FIGS. 27A to 27C are diagrams showing terahertz sensing that can be included in embodiments.

FIG. 27A is a diagram showing THz sensing according to an embodiment. An inspection device 2700 can include a THz sensor, and in some embodiments, one or more other sensors. An inspection device can sense layer properties on a surface of an inspected object 2752. In some embodiments, an inspection location 2758 can be indicated with an AR device as described herein.

Figure 27B:
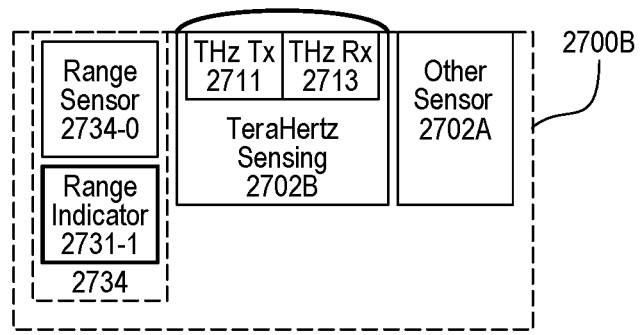

FIG. 27B is a block diagram of an inspection device 2700B according to an embodiment. Inspection device 2700B can include a THz sensor 2702B, ranging system 2734 and one or more other sensors 2702A. In the embodiment shown, a THz sensor 2702B can be a time domain type sensor, having a transmitter 2711 and receiver 2713 which can receive a delayed version a transmitted pulse. A ranging system 2734 can include a range sensor 2734-0 that can determine a range between THz sensor 2702B and a measured surface. A range indicator 2731-1 can indicate when a THz sensor 2702B is at the desired distance from an inspected object surface. In some embodiments, a range indicator 2731-1 can control activation of a THz sensor 2702B. In some embodiments, a range sensors 2734-0 can include a LIDAR system. Other sensor(s) 2702A can include any other appropriate sensor, including those described herein.

Figure 27C:
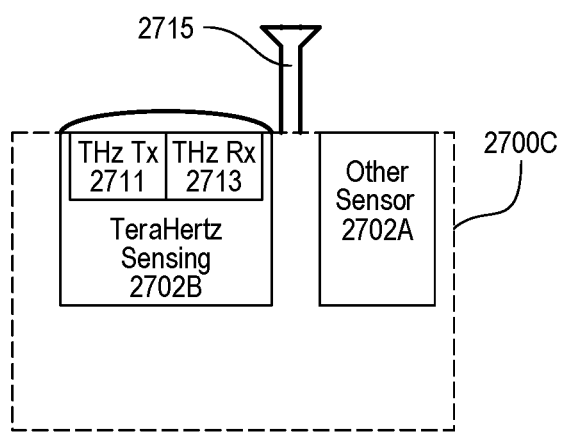

FIG. 27C is a block diagram of an inspection device 2700C according to another embodiment. Inspection device 2700C can include items like those of FIG. 27B. Inspection device 2700C can differ from FIG. 27C in that it can include one or more standoff members (one shown as 2715) that can be used to establish a desired distance between a measured surface and THz sensor 2702B.

It is noted that the various methods and applications shown herein are provided by way of example, and should not necessarily be construed as limiting. Further, while some embodiments are presented in terms of systems and methods related to automobiles, it is understood that the invention disclosed is anticipated for use with any object that could be subject to repair or other alteration. Accordingly, the invention could be used in conjunction with other types of vehicles, including aircraft, rail cars, construction equipment, military equipment, or any other suitable product subject to repair or alteration.

It will be apparent to those skilled in the art that various modifications and variations can be made without departing from the spirit or scope of the invention. Thus, it is intended that the disclosed embodiments cover modifications and variations that come within the scope of the claims that eventually issue in a patent(s) originating from this application and their equivalents. In particular, it is explicitly contemplated that any part or whole of any two or more of the embodiments and their modifications described above can be combined in whole or in part.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention. It is also understood that other embodiments of this invention may be practiced in the absence of an element/step not specifically disclosed herein.

What is claimed is:

1. An inspection system, comprising:
at least one wearable device comprising a display;
at least one inspection device that includes
a handheld computing device configured with
an authentication tool to authenticate a user to the at least one inspection device, and
an augmented reality application to present measuring locations on an inspected object as overlay data on the inspected object as the inspected object is viewed through the display of the at least one wearable device,
a meter portion comprising at least two different meters configured to acquire thickness measurements for layers formed on surfaces of the inspected object, and
an imaging device configured to acquire an image of a region of interest on the inspected object;
communication circuits configured to transmit thickness measurements and images of the inspected object generated by the at least one inspection device; and
a server system in communication with the at least one inspection device and configured to
receive at least the thickness measurements and images from the at least one inspection device, and
adjust a value of the inspected object based on at least the thickness measurements and images from the at least one inspection device.

2. The system of claim 1, wherein the at least two different meters comprises a terahertz sensor.

3. The system of claim 1, wherein the meter portion further includes any selected from the group of: an eddy current sensor, magnetic sensor and ultrasonic sensor.

4. The system of claim 1, wherein the communication circuits are further configured to transmit an identification for the inspected object, information identifying the inspector, a timestamp value, and location information.

5. The system of claim 1, wherein the inspected object is selected from the group of: automobiles, truck tractors, van trucks, construction equipment, farm equipment, aircraft and watercraft.

6. The system of claim 1, wherein the at least one inspection device further includes a LIDAR system.

7. The system of claim 1, wherein the communication circuits are configured to communicate with built-in wireless circuits of the inspected object.

8. The system of claim 6, further including:
the at least one inspection device includes a scanning system configured to scan at least portions of the inspected object with the LIDAR system; and
an inspection system configured to receive LIDAR scan data from the LIDAR system; wherein
the inspection system is configured to identify the inspected object with at least LIDAR scan data.

9. The system of claim 6, further including:
the at least one inspection device includes a scanning system configured to scan at least portions of the inspected object with the LIDAR system; and
an inspection system configured to receive LIDAR scan data from the LIDAR system; wherein
the inspection system is configured to identify portions of the inspected object with at least LIDAR scan data.

10. The system of claim 9, wherein the inspection system is configured to determine if portions of the inspected object are outside of a specification with at least LIDAR scan data.

11. The system of claim 9, wherein:
the handheld device is configured to transmit LIDAR scan data to the server system; and
the server system includes the inspection system.

12. A method, comprising:
identifying an inspected object with an inspection device;
viewing the inspected object through an augmented reality device that presents overlay data on the inspected object as it is viewed, the overlay data including inspection points on the inspected object;
by operation of a meter portion of the inspection device, measuring a thickness of a layer formed on the surface of the inspected object at some of the inspection points, the measuring including the use of at least one of a plurality of sensors included in the inspection device;
in response to detecting a region of interest on the surface of the inspected object, taking an image of the region of interest;
by operation of communication circuits, transmitting at least the thickness measurements and images to a server system;
receiving thickness measurements and images at the server system; and
adjusting a value of the inspected object based on at least the thickness measurements and images from the at least one inspection device.

13. The method of claim 12, wherein:
identifying the inspected object includes
establishing a secure wireless connection with built-in wireless circuits of the inspected object with the inspection device, and
receiving object data at the inspection device from the inspected object over the wireless connection.

14. The method of claim 13, wherein:
the inspected object is a vehicle; and
the object data comprises data transmitted on a data bus of the vehicle comprising an identification number.

15. The method of claim 13, wherein establishing the wireless connection includes authenticating the inspection.

16. The method of claim 12, wherein the use of at least one of the plurality of meters includes using a terahertz sensor.

17. The method of claim 12, further including:
the inspection device includes a LIDAR system; and
scanning the inspected object with the LIDAR system.

18. The method of claim 17, further including identifying the inspected object with LIDAR scan data generated by the LIDAR system.

19. The method of claim 17, further including:
scanning a portion of the inspected object with the LIDAR system; and
comparing features of the scanned portion with original equipment manufacturer specifications.

20. The method of claim 19, wherein:
the inspected object is a vehicle; and
the scanned portions are selected from the group of panels, parts, bumpers, engine compartment regions, vehicle interior regions and portions of an undercarriage.

* * * * *